United States Patent
Doi

(10) Patent No.: US 7,296,885 B2
(45) Date of Patent: *Nov. 20, 2007

(54) LIQUID COMPOSITION FOR INK JET, INK SET FOR INK JET, INK JET RECORDING METHOD AND INK JET RECORDING APPARATUS

(75) Inventor: Takatsugu Doi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 390 days.

This patent is subject to a terminal disclaimer.

(21) Appl. No.: 11/049,129

(22) Filed: Feb. 2, 2005

(65) Prior Publication Data

US 2006/0023042 A1    Feb. 2, 2006

(30) Foreign Application Priority Data

Jul. 28, 2004    (JP)    ............................. 2004-220204
Aug. 4, 2004    (JP)    ............................. 2004-228152

(51) Int. Cl.
*G01D 11/00* (2006.01)
*C09D 11/02* (2006.01)

(52) U.S. Cl. ..................... 347/100; 347/95; 106/31.58; 106/31.86

(58) Field of Classification Search ................ 347/100, 347/95, 96, 101; 106/31.6, 31.27, 31.13, 106/31.58, 31.86, 31.47, 31.49; 523/160
See application file for complete search history.

(56) References Cited

U.S. PATENT DOCUMENTS 4,325,735 A    4/1982    Ohta et al.
5,198,023 A    3/1993    Stoffel
5,320,668 A    6/1994    Shields et al.
5,518,534 A    5/1996    Pearlstine et al.
5,536,306 A    7/1996    Johnson et al.
5,555,008 A    9/1996    Stoffel et al.
5,679,143 A    10/1997    Looman
5,976,231 A    11/1999    Schwarz
6,022,908 A    2/2000    Ma et al.
6,048,388 A    4/2000    Schwarz
6,367,923 B1    4/2002    Koitabashi
6,573,405 B1    6/2003    Abbott et al.

(Continued)

FOREIGN PATENT DOCUMENTS

JP    63-265681    11/1988

(Continued)

*Primary Examiner*—Manish S. Shah
(74) *Attorney, Agent, or Firm*—Fildes & Outland, P.C.

(57) ABSTRACT

It is an object to provide a liquid composition for ink jet which contains at least an organic acid having an acid dissociation constant pKa of 4.5 or less, a water-soluble solvent, and water, further including at least one of compounds selected from the following group, and this is utilized for an ink set for ink jet, an ink jet recording method and an ink jet recording apparatus, (a): a polyvalent metallic salt having an amount of addition to the organic acid which is equal to or more than 0.01 and is less than 1 in a mole ratio (the polyvalent metallic salt/organic acid); and (b): an organic amine compound having an amount of addition to the organic acid which is equal to or more than 0.1 and is equal to or less than 0.9 in a mole ratio (an organic amine compound/organic acid).

22 Claims, 7 Drawing Sheets

U.S. PATENT DOCUMENTS

| | | |
|---|---|---|
| 7,048,452 B2 | 5/2006 | Malagrino, Jr. |
| 2004/0035293 A1 | 2/2004 | Davis |
| 2004/0244645 A1 | 12/2004 | Doi et al. |
| 2005/0166792 A1 | 8/2005 | Doi |
| 2005/0183628 A1 | 8/2005 | Lchman et al. |
| 2005/0264630 A1 | 12/2005 | Doi |
| 2006/0066661 A1 | 3/2006 | Yamashita et al. |
| 2006/0139426 A1 | 6/2006 | Doi |
| 2006/0203055 A1 | 9/2006 | Doi |

FOREIGN PATENT DOCUMENTS

| | | |
|---|---|---|
| JP | 2667401 | 12/1988 |
| JP | 2711888 | 9/1990 |
| JP | 8-72233 | 3/1996 |
| JP | 9-176531 | 7/1997 |
| JP | 2000-109735 | 4/2000 |
| JP | 3033069 | 4/2000 |
| JP | 2001-294788 | 10/2001 |
| JP | 2004-339346 | 12/2004 |

FIG.5
(PRINTING PATTERN A)
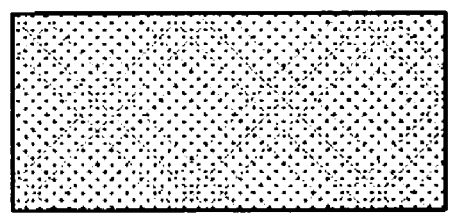
LIQUID 1 / LIQUID COMPOSITION
PRINTING PORTION

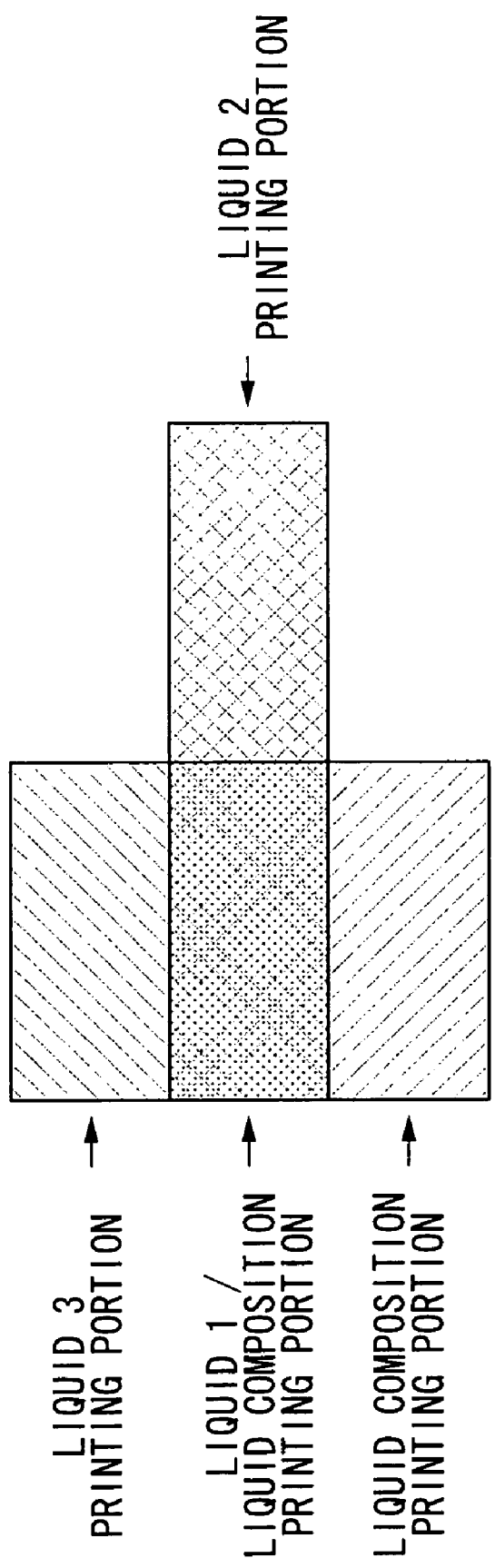

LIQUID COMPOSITION FOR INK JET, INK SET FOR INK JET, INK JET RECORDING METHOD AND INK JET RECORDING APPARATUS

CROSS-REFERENCE TO RELATED APPLICATION

This application claims priority under 35 USC 119 from Japanese Patent Application Nos. 2004-220204 and 2004-228152, the disclosures of which is incorporated by reference herein.

BACKGROUND OF THE INVENTION

1. Field of the Invention

The present invention relates to a liquid composition for ink jet printing, an ink set for ink jet printing, an ink jet recording method, and an ink jet recording apparatus.

2. Description of the Related Art

Ink jet systems for ejecting ink from an ink ejection port formed of a nozzle, a slit or a porous film have been used in many printers due to their being small-sized and inexpensive. Of these ink jet systems, a piezo ink jet system for ejecting ink by utilizing the deformation of a piezoelectric unit and a thermal ink jet system for ejecting ink by utilizing the boiling phenomenon of an ink by way of thermal energy are excellent in a high resolution and a high-speed printing property.

At present, increased speed and enhancement of picture quality on plain paper are taken as one of the important objective of an ink jet printer. In order to attaining this objectives, there has been proposed an image forming method of adhering a liquid containing a compound having a cationic group onto a recording medium and then adhering an ink containing an anion dye immediately after the liquid has permeated into the recording medium and is thus present in the medium, and has left the surface of the medium, thereby forming an amage (see U.S. Pat. No. 2,667,401, for example). In this method, in some cases in which the time required for drying of an ink is shortened, the density of an image is insufficient. In some cases in which printing is carried out with a small amount of drops, moreover, the long term ejecting property is insufficient.

In order to obtain a high-speed drying property, a high optical density and enhancement of picture quality, moreover, there has been proposed a color ink set characterized by a black ink containing water and a water-soluble solvent, a drying time on a piece of plain paper being equal to or less than five seconds, a color ink containing a coloring agent, water, a water-soluble solvent and a flocculant for flocculating the components of the black ink, and the time required for permeation in the plain paper being equal to or less than five seconds (for example, see JP-A No. 2001-294788). In some cases in which this system is used and a pigment is used for the coloring agent of a color ink, there is excellent optical density, blur and intercolor blur, but long-term storage stability is insufficient due to a flocculant. An electrolyte or a polyvalent metallic salt is usually used for the flocculant, and there is also a problem in that their effect as the flocculant are excessively great.

In order to improve jetting property of an inkjet sustem, moreover, there has been proposed an ink containing a nitrogen-containing five-membered ring keto acid such as pyrrolidone carboxylic acid or a salt thereof (see JP-A No. 63-265681; U.S. Pat. No. 2,711,888 and JP-A No. 2000-109735, for example). This system utilizes the effect of a moisturizing property provided by the nitrogen-containing five-membered ring keto acid salt and has an objective of improving the jetting property. In some cases in which a liquid containing the nitrogen-containing five-membered ring keto acid is used together with a liquid containing a coloring material as in the invention, however, it is impossible to achieve compatibility of picture quality and long-term storage stability.

As described above, with conventional methods, it is impossible to simultaneously have satisfactory optical density, blur, intercolor blur, drying time, and long-term storage stability.

Accordingly, the present invention has been made in view of the above circumstances and provides an ink set for ink jet printing, an ink jet recording method and an ink jet recording apparatus which are excellent in optical density, blur, intercolor blur, drying time, and long-term storage stability.

Further, the invention provides a liquid composition for ink jet printing to be used therein.

SUMMARY OF THE INVENTION

A first aspect of the invention is directed to a liquid composition for ink jet printing which contains at least an organic acid having an acid dissociation constant pKa of 4.5 or less, a water-soluble solvent, and water, further comprising at least one of the compounds selected from the following group, (a): a polyvalent metallic salt having an amount of addition to the organic acid which is equal to or more than 0.01 and is less than 1 in mole ratio (the polyvalent metallic salt/organic acid); and (b): an organic amine compound having an amount of addition to the organic acid which is equal to or more than 0.1 and is equal to or less than 0.9 in mole ratio (the organic amine compound/organic acid).

BRIEF DESCRIPTION OF THE DRAWINGS

FIG. 5 is a view showing a printing pattern for an evaluation in an example, FIG. 7 is a view showing a printing pattern for the evaluation in the example.

DETAILED DESCRIPTION OF THE INVENTION

Figure 1:
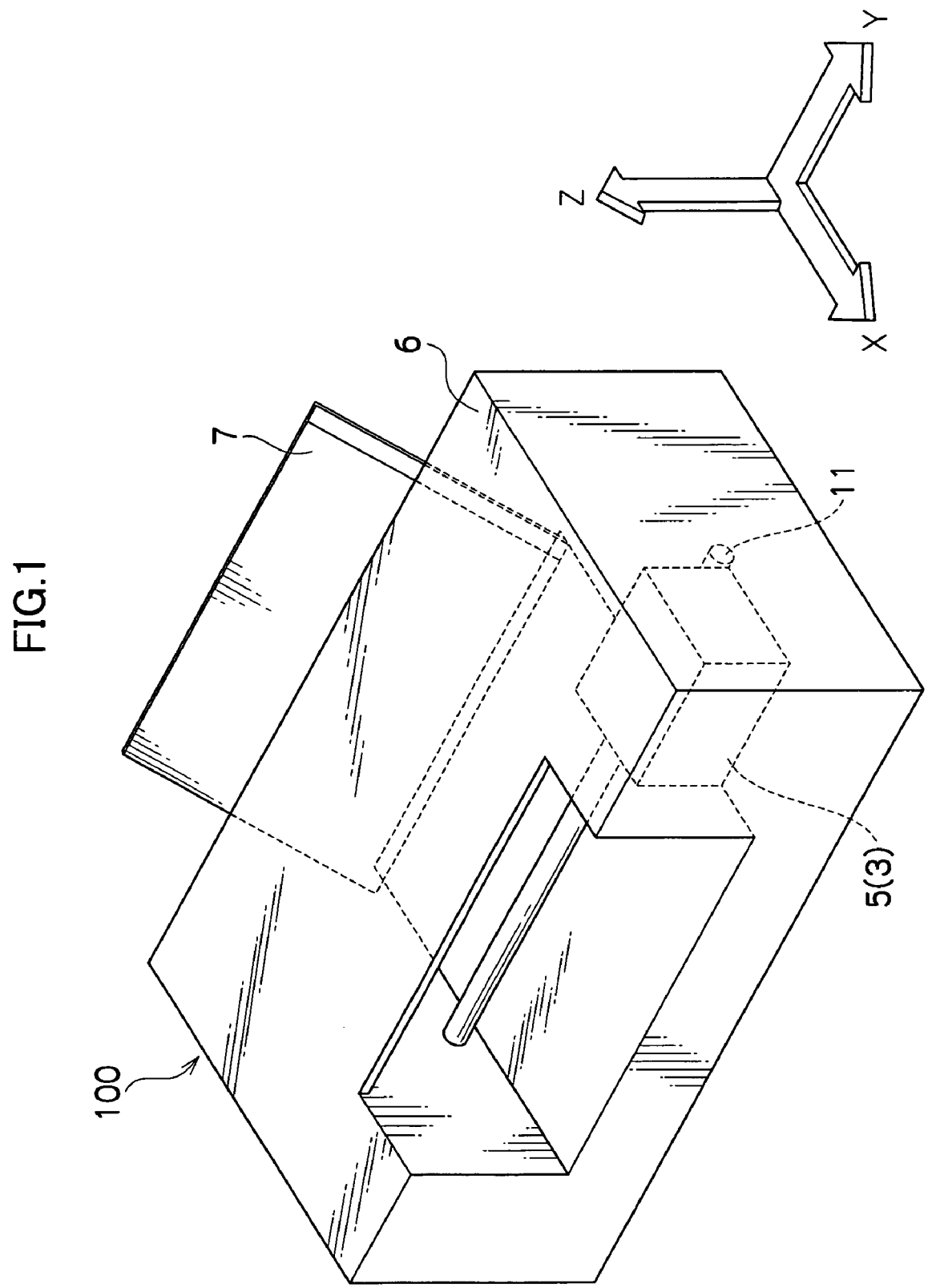
FIG. 1 is a perspective view showing the structure of an appearance according to a preferred embodiment of an ink jet recording apparatus in accordance with the invention.

In order to solve the problems of the invention, vigorous investigations were made. As a result, it was concluded that the claims of the invention are met and an optical density, a blur, an intercolor blur, a drying time and a long-term storage stability are thus satisfied at the same time.

More specifically, the liquid composition for ink jet according to the invention contains at least an organic acid having an acid dissociation constant pKa of 4.5 or less, a water-soluble solvent, and water, and an ink solution for ink jet can be flocculated.

In the liquid composition for ink jet according to the invention, it is suitable that at least one of compounds selected from the following group should be further contained.

(a): A polyvalent metallic salt having an amount of addition to the organic acid which is equal to or more than 0.01 and is less than 1 in a mole ratio (the polyvalent metallic salt/organic acid); and (b): An organic amine compound having an amount of addition to the organic acid which is equal to or more than 0.1 and is equal to or less than 0.9 in a mole ratio (an organic amine compound/organic acid)

In the liquid composition for ink jet according to the invention, it is suitable that the organic acid should be a compound expressed in the following general formula (1).

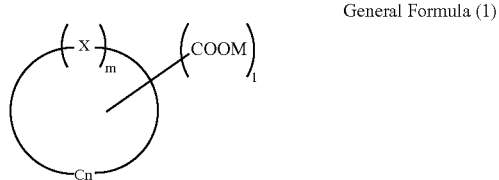

General Formula (1)

(In the formula, X represents O, CO, NH, NR, S or $SO_2$, R represents an alkyl group, M represents a hydrogen atom, an alkali metal or amines, l represents an integer of 1 to 5, m represents 1 or 2, and n represents an integer of 3 to 7).

In the liquid composition for ink jet according to the invention, it is suitable that the compound expressed in the general formula (1) should be at least one selected from the group consisting of a pyrrolidone carboxylic acid, a pyrone carboxylic acid, a pyrrol carboxylic acid, a furan carboxylic acid, a pyridine carboxylic acid, a coumalic acid, a thiophene carboxylic acid, a nicotinic acid, derivatives of their compounds, and their salts.

In the liquid composition for ink jet according to the invention, it is suitable that pH should be equal to or more than 2.5 and should be equal to or less than 7.0.

In the liquid composition for ink jet according to the invention, it is suitable that a weight-average molecular weight of the organic amine compound should be equal to or less than 1000.

In the liquid composition for ink jet according to the invention, it is suitable that an amount of addition of the organic amine compound in the liquid composition should be equal to or more than 0.01% by mass and should be equal to or less than 30% by mass with respect to a whole amount of the liquid composition.

In the liquid composition for ink jet according to the invention, it is suitable that an amount of addition of the organic acid in the liquid composition should be equal to or more than 0.01% by mass and should be equal to or less than 30% by mass with respect to a whole amount of the liquid composition.

The invention provides an ink set for ink jet which has at least a first liquid (an ink solution for ink jet) and a second liquid (a liquid composition for ink jet), the first liquid contains at least a coloring material, a water-soluble solvent and water, and the second liquid is the liquid composition for ink jet according to the invention.

In the ink set for ink jet according to the invention, it is suitable that the coloring material in the first liquid should be a pigment which is at least one selected from the group consisting of a pigment having the pigment dispersed by a polymer dispersing agent, a self-dispersable pigment, and a pigment covered with a resin.

In the ink set for ink jet according to the invention, it is suitable that a volume-average particle size of a particle of the coloring material in the first liquid should be equal to or more than 30 nm and should be equal to or less than 250 nm.

In the ink set for ink jet according to the invention, it is suitable that the first liquid should have a surface tension which is equal to or more than 20 mN/m and is equal to or less than 60 mN/m.

In the ink set for ink jet according to the invention, it is suitable that the first liquid should contain a resin having a carboxylic acid group.

In the ink set for ink jet according to the invention, it is suitable that the second liquid should contain at least one coloring material selected from the group consisting of a dye, a pigment having sulfonic acid or sulfonate on a surface, and a self-dispersing pigment.

In the ink set for ink jet according to the invention, it is suitable that the second liquid should have a surface tension which is equal to or more than 20 mN/m and is equal to or less than 45 mN/m.

In the ink set for ink jet according to the invention, it is suitable that the first liquid and the second liquid should have viscosities which are equal to or more than 1.2 mPa·s and are equal to or less than 25.0 mPa·s.

In the ink set for ink jet according to the invention, it is suitable that the number of particles having a size of 5 μm or more in a mixed solution of the first liquid and the second liquid should be equal to or more than 1,000/μL.

The invention provides an ink jet recording method using an ink set for ink jet, wherein the ink set for ink jet is the ink set for ink jet according to the invention, and the first liquid and the second liquid are applied onto a recording medium so as to come in contact with each other, thereby forming an image.

In the ink jet recording method according to the invention, it is suitable that the first liquid and the second liquid should be applied onto the recording medium in an amount of 25 ng or less per drop.

In the ink jet recording method according to the invention, it is suitable that an amount of each of the first liquid and the second liquid to be applied for forming one pixel should range from 1:20 to 20:1 in a mass ratio.

The invention provides an ink jet recording apparatus comprising a recording head for ejecting, to a recording medium, each of the liquids in the ink set for ink jet, wherein the ink set for ink jet is the ink set for ink jet according to the invention.

In the ink jet recording apparatus according to the invention, it is suitable that the first liquid and the second liquid should be applied onto the recording medium in an amount of 25 ng or less per drop.

In the ink jet recording apparatus according to the invention, it is suitable that an amount of each of the first liquid and the second liquid to be applied for forming one pixel should range from 1:20 to 20:1 in a mass ratio.

As described above, the liquid composition for ink jet, the ink set for ink jet, the ink jet recording method and the ink jet recording apparatus according to the invention are excellent in an optical density, a blur, an intercolor blur, a drying time, and a long-term storage stability.

The invention will be described below in detail.

(Ink Set for Ink Jet and Liquid Composition for Ink Jet)

An ink set for ink jet according to the invention is constituted to include a first liquid and a second liquid which is caused to have the function of flocculating the first liquid. As the second liquid, there is used a liquid composition for ink jet containing an organic acid having an acid dissociation constant pKa of 4.5 or less (a liquid composition for ink jet according to the invention), preferably, a liquid composition for ink jet further containing an organic amine compound or a polyvalent metallic salt in a specific ratio with respect to the organic acid.

By carrying out printing in such a manner that the first liquid and the second liquid come in contact with each other, it is possible to improve an optical density, a blur and an intercolor blur. Although a mechanism is not apparent, it is supposed that the organic acid having the acid dissociation constant pKa of 4.5 or less has the function of flocculating the first liquid, and the printing is carried out to cause the two kinds of liquids to come in contact with each other over a recording medium and a coloring material can be thus caused to stay on the surface of the recording medium at a high density.

Referring to the reason why the organic acid having the acid dissociation constant pKa of 4.5 or less is suitable for a material to flocculate the first liquid, it is guessed that there are three following reasons.

<1> The organic acid having the acid dissociation constant pKa of 4.5 or less has a high degree of dissociation of an acidic group and is acidic. In the case in which a coloring material having an anionic surface functional group is used for the first liquid, accordingly, the function of inhibiting the dissociation of the surface functional group of the coloring material of the first liquid is fulfilled when the two liquids come in contact with each other, and the coloring material is thus flocculated.

<2> It can be supposed that the organic acid having the acid dissociation constant pKa of 4.5 or less has the function of a pH buffer. For this reason, there is a feature that a pH fluctuation caused by the concentration of a hydrogen ion is small within the specific pH range of an acidity. As a result, it can be supposed that pH is maintained on an acid side and the coloring material of the first liquid can be flocculated effectively when the first liquid and the second liquid are mixed with each other.

<3> There is also a function of the organic acid having the acid dissociation constant pKa of 4.5 or less and an electrolyte. Accordingly, it can be supposed that an electrostatic repulsive force between pigments is reduced to promote a flocculation in the case in which the pigments are used for the coloring material of the first liquid.

Referring to the reason why the polyvalent metallic salt is suitable for a material to flocculate the first liquid, next, it is mainly guessed that there are two following reasons.

<1> In a system using a pigment as a coloring material, it is supposed that the polyvalent metallic salt attenuates an electrostatic repulsive force between-pigments and produces an advantage to promote the flocculation of the pigments.

<2> It can be supposed that a polyvalent metal forms an ionomer structure with a carboxylic acid in the case in which a pigment having a carboxylic acid group on a surface thereof or a liquid containing an organic compound having the carboxylic acid group is mixed. Accordingly, the size of a molecular structure is increased, and at the same time, the amount of a hydrophilic group on the surface of a pigment or the amount of a hydrophilic group of an organic compound is decreased. For this reason, it can be supposed that the pigment or the organic compound can be flocculated. Furthermore, it is supposed that the organic compound is flocculated while taking another coloring material therein. Therefore, the flocculation of the coloring material is accelerated in the case in which a dye is used for the coloring material in addition to the case in which the pigment is used.

On the other hand, it was also found that the organic acid and the polyvalent metallic salt cause the following drawbacks, respectively.

It is desirable that the organic acid having the acid dissociation constant pKa of 4.5 or less should be used in a partial neutralizing state in order to enhance a flocculation efficiency and to improve picture quality. However, there is the case in which it is hard to cause the picture quality to be compatible with a long-term storage stability. Although the mechanism is not apparent, it can be supposed that the organic acid is deposited when an addition is carried out in a high concentration because the organic acid does not have a sufficient solubility to water.

Referring to the polyvalent metallic salt, it is desirable that the amount of addition should be increased in order to enhance a flocculation efficiency and to improve picture quality. However, it was found that a directional defect is generated in some cases in which the amount of the addition of the polyvalent metallic salt is increased. Although the mechanism is not apparent, it can be supposed that the polyvalent metallic salt is deposited and stuck onto the tip of a nozzle, resulting in a variation in the water repellency of the nozzle.

In consideration of the results, therefore, vigorous investigations were made. As a result, it was found that picture quality, and a long-term storage stability and a long-term jet reliability are compatible with each other by using the organic acid and the polyvalent metallic salt in a proper ratio. Although the mechanism is not apparent, it can be supposed that an intermolecular interaction such as a chelate action is caused between a polyvalent metal and an organic acid and both of them can be present stably. Furthermore, it has been known that the polyvalent metallic salt generates a slightly water-soluble hydroxide ion under an alkali condition. It is guessed that there is an advantage that the generation of the hydroxide salt of a polyvalent metal can be suppressed and a stabilization can be thus obtained by the addition of the polyvalent metallic salt together with the organic acid.

By using an organic amine compound as an alkali agent for dissolving an organic acid together with the organic acid having the acid dissociation constant pKa of 4.5 or less, it is possible to enhance a solubility into the water of the organic acid also in a low neutralizing state and to thereby cause the reliability of a liquid composition and the picture quality to be compatible with each other. Although the mechanism is not apparent, it is supposed that both the organic acid and the organic amine compound have a hydrocarbon type skeleton and an affinity is enhanced by a hydrophobic interaction.

First of all, the first liquid will be described. The first liquid contains at least a coloring material, a water-soluble solvent and water.

The coloring material to be used for the first liquid may be a dye or a pigment, and the pigment is particularly preferable. The reason is as follows. It is supposed that the pigment is flocculated more easily in a mixture with the second liquid than the dye. Above all, a pigment dispersed by a polymer dispersing agent, a self-dispersable pigment and a pigment covered with a resin are preferable.

Both an organic pigment and an inorganic pigment can be used for the pigment to be utilized in the invention, and examples of a black pigment include a carbon black pigment such as furnace black, lamp black, acetylene black or channel black. It is also possible to use pigments having a black color and three primary colors of cyan, magenta and yellow, and furthermore, a pigment having a specific color such as red, green, blue, brown or white, a metallic luster pigment having a gold or silver color, an extender having no color or a light color, or a plastic pigment. Moreover, it is also possible to use, as the pigment, a particle having a dye or a pigment stuck to a surface thereof, the insoluble laked substance of a dye, colored emulsion or colored latex by setting silica, alumina or a polymer bead to be a core. For the invention, furthermore, it is also possible to use a pigment synthesized newly.

Specific examples of the pigment used in the present invention include Raven 7000, Raven 5750, Raven 5250, Raven 5000 Ultra II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation): Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While examples of the cyan color include C.I. Pigment Blue-1, -2, -3, -15, -15:1, -15:2, -15:3, -15:4, -16, -22 and -60, the pigments are not restricted thereto.

While examples of the magenta color include C.I. Pigment Red-5, -7, -12, -48, -48:1, -57, -112, -122, -123, -146, -168, -184 and -202, the pigments are not restricted thereto.

While examples of the yellow color include Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

The self-dispersible pigment in water used in the present invention refers to the pigment having many water-solubilizing groups on the surface of the pigment that is able to be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

In addition to the surface-modified pigments described above, commercially available pigments such as Cab-o-jet-200, Cab-o-jet-300, IJX-253, IJX-266, IJX-273, IJX-444 and IJX-55 (manufactured by Cabot Corporation), and Microjet Black CW-1 and CW-2 (manufactured by Orient Chemical Industries, Ltd.) may also be used as the self-dispersible pigment in water.

For the coloring material to be used in the first liquid which is the self-dispersing pigment, a coloring material containing a carboxylic acid group in a functional group on a surface thereof is preferable. It is guessed that the dissociation of a carboxylic acid can be suppressed by the organic acid having the acid dissociation constant pKa of 4.5 or less and the flocculation can be thus promoted because the carboxylic acid has a low degree of dissociation.

In the case in which the coloring material to be used in the first liquid has a sulfonic acid group on the surface thereof, it is preferable that a polymer compound having the carboxylic acid group (a resin having the carboxylic acid group) should be added in addition to the coloring material. The coloring material having the sulfonic acid group on the surface thereof is hard to flocculate. For this reason, an optical density, a blur and an intercolor blur tend to be unimproved. On the other hand, in the case in which the polymer compound having the carboxylic acid group is added, the insolubility of a polymer compound is generated when the two liquids are mixed. In this case, the pigment is taken into the polymer compound and is thus flocculated. Therefore, it is guessed that the optical density, the blur and the intercolor blur can be improved.

The pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Either water-soluble dyes or dispersion dyes may be used in the present invention. Specific examples of the water-soluble dye include C.I. Direct Black-2, -4, -9, -11, -17, -19, -22, -32, -80, -151, -154, -168, -171, -194 and -195; C.I. Direct Blue-1, -2, -6, -8, -22, -34, -70, -71, -76, -78, -86, -112, -142, -165, -199, -200, -201, -202, -203, -207, -218, -236, -287 and -307; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189 and 227; C.I. Direct Yellow-1, -2, -4, -8, -11, -12, -26, -27, -28, -33, -34, -41, -44, -48, -58, -86, -87, -88, -132, -135, -142, -144 and -173; C.I. Food Black-1 and -2; C.I. Acid Black-1, -2, -7, -16, -24, -26, -28, -31, -48, -52, -63, -107, -112, -118, -119, -121, -156, -172, -194 and -208; C.I. Acid Blue-1, -7, -9, -15, -22, -23, -27, -29, -40, -43, -55, -59, -62, -78, -80, -81, -83, -90, -102, -104, -111, -185, -249 and -254; C.I. Acid Red-1, -4, -8, -13, -14, -15, -18, -21, -26, -35, -37, -52, -110, -144, -180, -249, -257 and -289; and C.I. Acid Yellow-1, -3, -4, -7, -11, -12, -13, -14, -18, -19, -23, -25, -34, -38, -41, -42, -44, -53, -55, -61, -71, -76, -78, -79 and -122.

Specific examples of the dispersion dye include C.I. Disperse Yellow-3, -5, -7, -8, -42, -54, -64, -79, -82, -83, -93, -100, -119, -122, -126, -160, -184:1, -186, -198, -204 and 224; C.I. Disperse Orange-13, -29, -31:1, -33, -49, -54, -66, -73, -119 and -163; C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356 and -362; C.I. Disperse Violet-33; C.I. Disperse Blue-14, -26, -56, -60, -73, -87, -128, -143, -154, -165, -165:1, -176, -183, -185, -201, -214, -224, -257, -287, -354, -365 and -368; and C.I. Disperse Green-6:1 and -9.

The colorant is used in a proportion in the range of not less than 0.1% by mass and not more than 20% by mass, preferably not less than 1% by mass and not more than 10% by mass relative to the total mass of the first liquid in the present invention. Sufficient optical density maybe not able to be obtained when the proportion of the colorant in the liquid is less than 0.1% by mass, while ejection characteristics may become unstable when the proportion of the colorant is larger than 20% by mass.

In the invention, a polymer dispersing agent can also be used for the first liquid in order to disperse a pigment. On the other hand, also in the case in which a pigment which is self-dispersable into water is used, the polymer dispersing agent can be used together. For the polymer dispersing agent, it is possible to use a nonionic compound, anionic compound, a cationic compound and an amphoteric compound.

For example, copolymers of monomers having an $\alpha,\beta$-ethylene unsaturated group can be taken. Examples of the monomer having the $\alpha,\beta$-ethylene unsaturated group include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, vinyl naphthalene sulfonate, vinyl alcohol, acrylamide, methacryloxyethyl phosphate, bismethacryloxyethyl phosphate, methacryloxyethyl phenyl acid phosphate, ethylene glycol dimethacrylate, diethylene glycol dimethacrylate, a styrene derivative such as styrene, $\alpha$-methylstyrene, vinyl toluene, vinyl cyclohexane, vinyl naphthalene, a vinyl naphthalene derivative, acrylic acid alkylester, phenyl acrylate, alkyl methacrylate, phenyl methacrylate, cycloalkyl methacrylate, alkyl crotonate, dialkyl itaconate, and dialkyl maleinate.

The polymers obtained by homopolymerization of the monomer having the ethylenic $\alpha,\beta$-unsaturated group, or copolymers obtained by copolymerization of a plurality of the monomers having the ethylenic $\alpha,\beta$-unsaturated groups can be used as the polymer dispersant. Specific examples thereof include styrene-styrene sulfonate copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

It is preferable that the polymer dispersing agent to be used in the first liquid should have a weight-average molecular weight of 2,000 to 50,000. In some cases in which the molecular weight of the polymer dispersing agent is less than 2,000, the pigment is not dispersed stably. On the other hand, in some cases in which the molecular weight is more than 50,000, the viscosity of the liquid is increased so that a discharging property is deteriorated. A more preferable weight-average molecular weight is 3,500 to 20,000.

The polymer dispersing agent to be added into the first liquid is used within a range of 0.01 to 3% by mass. In some cases in which the amount of addition is more than 3% by mass, the viscosity of the liquid is increased so that the jet characteristic of the liquid becomes unstable. On the other hand, in some cases in which the amount of addition is less than 0.01% by mass, the dispersing stability of the pigment is deteriorated. For the amount of addition of the polymer dispersing agent is more preferably equal to or more than 0.05% by mass and equal to or less than 2.5% by mass, and is further preferably equal to or more than 0.1% by mass and equal to or less than 2% by mass.

It is preferable that the volume-average particle size of the particle of a coloring material in the first liquid should be equal to or more than 30 nm and be equal to or less than 250 nm. The volume-average particle size of the particle of the coloring material indicates the particle size of the coloring material itself or the size of the particle of the coloring material to which an additive such as a dispersing agent is stuck if any. In the invention, a microtrack UPA grading analyzer 9340 (manufactured by Leeds & Northrup Co., Ltd.) was used as an apparatus for measuring the volume-average particle size. The measurement was carried out by putting 4 ml of ink in a measuring cell in accordance with a predetermined measuring method. For a parameter to be input in the measurement, the viscosity of ink was used for a viscosity and the density of a pigment was used for the density of a dispersed particle. The volume-average particle size is more preferably equal to or more than 50 nm and equal to or less than 200 nm and is further preferably equal to or more than 75 nm and equal to or less than 175 nm. In some cases in which the volume-average particle size of the particle in the liquid is less than 30 nm, an optical density is reduced. On the other hand, in some cases in which the same volume-average particle size is more than 250 nm, a storage stability cannot be maintained.

For a water-soluble organic solvent to be used in the first liquid, polyhydric alcohols, a polyhydric alcohol derivative, a nitrogen-containing solvent, alcohols and a sulfur-containing solvent are used. Specific examples of the polyhydric alcohols include ethylene glycol, diethylene glycol, propylene glycol, butylene glycol, triethylene glycol, 1,5-pentane diol, 1,2,6-hexane triol and glycerin. Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin. Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide. In addition, it is also possible to use propylene carbonate and ethylene carbonate.

A single water-soluble organic solvent may be used in the first liquid or single or at least two types of water-soluble organic solvents may be mixed together. The content of the water-soluble organic solvent to be used is equal to or more than 1% by mass and is equal to or less than 60% by mass, and is preferably equal to or more than 5% by mass and equal to or less than 40% by mass. In some cases in which the amount of the water-soluble organic solvent in the liquid is less than 1% by mass, a sufficient optical density cannot be obtained. To the contrary, in some cases in which the amount of the water-soluble organic solvent is more than 60% by mass, the viscosity of the liquid is increased so that the jet characteristic of the liquid becomes unstable.

It is preferable that a water-soluble resin or a water-insoluble resin should be contained in the first liquid. The reason is that it is possible to produce such an advantage that the organic acid having the acid dissociation constant pKa of 4.5 or less flocculates the water-soluble resin or the water insoluble resin. It can be supposed that a coloring material is simultaneously taken in when the resin is flocculated. Accordingly, there is a tendency that the flocculating effect of the coloring material is enhanced and an optical density, a blur and an intercolor blur are improved.

It is preferable that a compound containing a carboxylic acid group should be used as the water-soluble resin or the water-insoluble resin. The reason is as follows. It is guessed that the degree of dissociation of the carboxylic acid group is low and the flocculation is thus promoted by the organic acid having the acid dissociation constant pKa of 4.5 or less. In the case in which a compound containing a sulfonic acid group is used for the coloring material, particularly, it is preferable that the water-soluble resin or the water-insoluble resin which contains the carboxylic acid group should be added. Preferably, examples of the compound include a styrene-acrylic acid copolymer, a styrene-methacrylic acid copolymer, a styrene-maleic acid copolymer, and a polyacrylic acid alkyl ester copolymer.

The amount of addition of the water-soluble resin or the water-insoluble resin is preferably equal to or more than 0.01% by mass and equal to or less than 10% by mass with respect to the whole first liquid, and is more preferably equal to or more than 0.1% by mass and equal to or less than 3% by mass.

It is preferable that the surface tension of the first liquid should be equal to or more than 20 mN/m and be equal to or less than 60 mN/m.

The surface tension is more preferably equal to or more than 20 mN/m and equal to or less than 45 mN/m, and is further preferably equal to or more than 20 mN/m and equal to or less than 35 mN/m. In some cases in which the surface tension is less than 20 mN/m, the liquid overflows into a nozzle surface and printing cannot be carried out normally. On the other hand, in some cases in which the surface tension is more than 60 mN/m, a permeability is obtained slowly so that a drying time is prolonged.

The viscosity of the first liquid is preferably equal to or more than 1.2 mPa·s and equal to or less than 25.0 mPa·s, is more preferably equal to or more than 1.5 mPa·s and less than 10.0 mPa·s, and is further preferably equal to or more than 1.8 mPa·s and less than 5.0 mPa·s. In some cases in which the viscosity of the first liquid is more than 25.0 mPa·s, an ejecting property is deteriorated. On the other hand, in some cases in which the viscosity is less than 1.2 mPa·s, a jet property is deteriorated.

Water is added within such a range as to obtain the surface tension and the viscosity as described above. The amount of addition of the water is not particularly restricted but is preferably equal to or more than 10% by mass and equal to or less than 99% by mass and is more preferably equal to or more than 30% by mass and equal to or less than 80% by mass with respect to the whole first liquid.

Next, description will be given to the second liquid (a liquid composition for ink jet). It is preferable that the second liquid should contain an organic acid having an acid dissociation constant pKa of 4.5 or less, a water-soluble solvent and water and should further contain a polyvalent metallic salt or an organic amine compound.

For the organic acid having the acid dissociation constant pKa of 4.5 or less, it is possible to use a compound expressed in the following general formula (1).

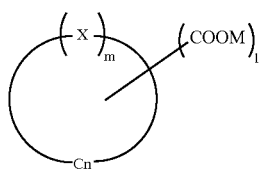

General Formula (1)

In the formula, X represents O, CO, NH, NR, S or $SO_2$ and R represents an alkyl group. R is preferably $CH_3$, $C_2H_5$ and $C_2H_4OH$. X is preferably CO, NH, NR and O, and more preferably CO, NH and O. M represents a hydrogen atom, an alkali metal or amines. M is preferably H, Li, Na, K, monoethanol amine, diethanol amine, and triethanol amine, is more preferably H, Na, and K, and is further preferably a hydrogen atom. n represents an integer of 3 to 7, preferably a heterocyclic ring having six-membered ring or five-membered ring, and more preferably the heterocyclic ring having five-membered ring. m represents 1 or 2. A compound expressed in the general formula (1) is a saturation ring or an unsaturation ring if it is the heterocyclic ring. l represents an integer of 1 to 5.

Examples of the organic acid having the acid dissociation constant pKa of 4.5 or less include arginine acid, citric acid, glycine, glutamic acid, succinic acid, tartaric acid, cysteine, oxalic acid, fumaric acid, phthalic acid, maleic acid, malonic acid, lycine, malic acid, the compounds expressed in the general formula (1), and the derivatives of the compounds.

Preferably, the organic acid having the acid dissociation constant pKa of 4.5 or less includes citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts of the compounds. More preferably, the organic acid includes the pyrrolidone carboxylic acid, the pyrone carboxylic acid, the pyrrole carboxylic acid, the furan carboxylic acid, the pyridine carboxylic acid, the coumalic acid, the thiophene carboxylic acid, the nicotinic acid, or the derivatives or salts of the compounds. Further preferably, the organic acid includes the pyrrolidone carboxylic acid, the pyrone carboxylic acid, the furan carboxylic acid, the coumalic acid, or the derivatives or salts of the compounds.

Specific examples of the compound expressed in the general formula (1) include the compound having furan, pyrrole, pyrroline, pyrrolidone, pyrone, pyrrole, thiophene, indole, pyridine, and quinoline structures, and furthermore, a compound having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethyl pyrrole-4-carboxylic acid, 2,4,5-trimethyl pyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

The organic acid having the acid dissociation constant pKa of 4.5 or less may be used single, or as a combination of at least two of them.

The acid dissociation constant was obtained by an acid-base titration curve at 20° C. More specifically, an organic acid solution and a sodium hydroxide solution which have the known amounts of addition are prepared and the sodium hydroxide solution is added into the organic acid solution. At this time, the amount of the sodium hydroxide thus added and the pH of the organic acid solution in that case are measured. Based on data thus acquired, a theoretical curve is optimized to obtain the acid dissociation constant.

For example, there will be shown a theoretical curve in which trivalent acid is used.

$$V_B = \left\{ \frac{\frac{K_1}{[H^+]} + 2\frac{K_1 K_2}{[H^+]^2} + 3\frac{K_1 K_2 K_3}{[H^+]^3}}{1 + \frac{K_1}{[H^+]} + \frac{K_1 K_2}{[H^+]^2} + \frac{K_1 K_2 K_3}{[H^+]^3}} C_A - ([H^+] - [OH^-]) \right\} \frac{V_A}{C_B + ([H^+] - [OH^-])}$$ [Equation 1]

$V_A$ represents an amount of an aqueous acid solution, $V_B$ represents a titer of an aqueous alkali solution, $C_A$ represents a concentration of the aqueous acid solution, $C_B$ represents a concentration of the aqueous alkali solution, $K_1$, $K_2$ and $K_3$ represent acid dissociation constants in first, second and third stages, $[H^+]$ represents a hydrogen ion concentration in an aqueous solution, and $[OH^-]$ represents a hydroxide ion concentration in the aqueous solution.

According to the invention, the smallest value of the pKa is used in a compound having a plurality of acidic groups.

It is preferable that the amount of addition of the organic acid having the acid dissociation constant pKa of 4.5 or less should be equal to or more than 0.01% by mass and be equal to or less than 30% by mass with respect to the whole amount of the liquid. The amount of addition is more preferably equal to or more than 0.1% by mass and equal to or less than 15% by mass and is further preferably equal to or more than 0.25% by mass and equal to or less than 10% by mass. In the case in which the amount of addition of the organic acid having the acid dissociation constant pKa in the second liquid of 4.5 or less is less than 0.01% by mass, the aggregation of a coloring material becomes insufficient in a contact with the first liquid so that an optical density, a blur and an intercolor blur are deteriorated. On the other hand, in some cases in which the amount of addition is more than 30% by mass, a jet characteristic is deteriorated so that the liquid is not jetted normally.

It is preferable that the pH of the second liquid containing the organic acid having the acid dissociation constant pKa or 4.5 or less should be equal to or more than 2.5 and be equal to or less than 7.0. The pH is further preferably equal to or more than 2.75 and equal to or less than 6.0 and is more preferably equal to or more than 3.0 and equal to or less than 4.5. In some cases in which the pH of the second liquid is less than 2.5, the ink passage component of a print head is dissolved so that the print head is broken down. On the other hand, in the case in which the pH of the second liquid is more than 7.0, the flocculation of the coloring material becomes insufficient in the contact with the first liquid so that the optical density, the blur and the intercolor blur are deteriorated.

The polyvalent metallic salt to be used in the invention includes a polyvalent metal ion such as an aluminum ion, a barium ion, a calcium ion, a copper ion, an iron ion, a magnesium ion, a manganese ion, a nickel ion, a tin ion, a titanium ion and a zinc ion, hydrochloric acid, hydrobromic acid, hydriodic acid, sulfuric acid, nitric acid, phosphoric acid, thiocyanic acid, and organic carboxylic acid such as acetic acid, oxalic acid, lactic acid, fumaric acid, citric acid, salicylic acid and benzoic acid, and organic sulfonic acid salts.

Specific examples include compounds such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitride, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

The polyvalent metallic salt produces a great effect of flocculating the component in the first liquid and a great effect of improving an optical density, a blur and an intercolor blur.

The polyvalent metallic salt may be used singly or at least two types may be mixed for use. Moreover, the content of the polyvalent metallic salt in the second liquid to be used is 0.01 to 15% by mass, preferably 0.1 to 10% by mass with respect to the whole amount of the liquid.

In the second liquid, the amount of addition of the polyvalent metallic salt to the organic acid is to be equal to or more than 0.01 and less than 1 in a mole ratio (the polyvalent metallic salt/organic acid). The mole ratio of the amount of addition of the polyvalent metallic salt to the amount of addition of the organic acid is more preferably equal to or more than 0.05 and equal to or less than 0.9 and is further preferably equal to or more than 0.05 and equal to or less than 0.75. In the case in which the mole ratio of the amount of addition of the polyvalent metallic salt to the amount of addition of the organic acid is equal to or higher than 1, a long-term jet property and a long-term storage stability become insufficient. In the case in which the mole ratio of the amount of addition of the polyvalent metallic salt to the amount of addition of the organic acid is lower than 0.01, moreover, the long-term storage stability becomes insufficient.

An organic amine compound to be used in the second liquid maybe any of class 1st, 2nd, 3rd and 4th amines and their salts. Specific examples include tetraalkyl ammonium, alkylamine, benzaconium, alkylpyridium, imidazolium, polyamine and their derivatives or salts. Specific examples include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-etyl hexyl amine, diethylene triamine, diphenyl amine, dibutyl amine, dipropyl amine, dihexyl amine, dipentyl amine, 3-(dimethyl amino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propanediol, N-acetyl amino ethanol, 2-(2-amino ethyl amino)-ethanol, 2-amino-2-ethyl-1,3-propanediol, 2-(2-amino ethoxy)ethanol, 2-(3,4-dimethoxyphenyl)ethyl amine, cetyl amine, triisopropanol amine, triisopentyl amine, triethanol amine, trioctyl amine, trityl amine, bis(2-aminoethyl) 1,3-propane diamine, bis(3-aminopropyl)ethylene diamine, bis(3-aminopropyl) 1,3-propane diamine, bis(3-amino propyl) methyl amine, bis(2-ethyl hexyl)amine, bis(trimethyl cylyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methyl pyridium chloride, a diaryl dimethyl ammonium chloride polymer, a diaryl amine polymer, and a monoaryl amine polymer.

More preferably, there are used triethanol amine, triisopropanol amine, 2-amino-2-ethyl-1,3-propanediol, ethanol amine, propane diamine, and propyl amine.

It is preferable that the organic amine compound should have a weight-average molecular weight of 1000 or less. The weight-average molecular weight is more preferably equal to or less than 500 and is further preferably equal to or less than 250. In some cases in which the molecular weight of the organic amine compound is more than 1000, a solubility to water is reduced so that the solubility of the organic acid having the acid dissociation constant pKa of 4.5 or less cannot be maintained sufficiently.

It is preferable that the amount of addition of the organic amine compound should be equal to or more than 0.01% by mass and be equal to or less than 30% by mass with respect to the whole amount of the liquid. The amount of addition is more preferably equal to or more than 0.1% by mass and equal to or less than 15% by mass and is further preferably equal to or more than 0.25% by mass and equal to or less than 10% by mass. In some cases in which the organic amine compound in the second liquid is less than 0.01% by mass, the solubility of the organic acid becomes insufficient so that a long-term storage stability is deteriorated. On the other hand, in the case in which the amount of addition is more than 30% by mass, a flocculating property is deteriorated in a mixture with an ink so that quality of an image is not sufficient.

In the second liquid, it is necessary to set the mole ratio of the amount of addition of the organic amine compound to the organic acid (organic acid:organic amine compound) to be 1:0.1 to 1:0.9. The mole ratio is more preferably 1:0.15 to 1:0.75 and is further preferably 1:0.2 to 1:0.5. In the case in which the mole ratio of the amount of addition of the organic amine compound to the organic acid is less than 1:0.1 (that is, the amount of the organic amine compound is too small), the organic acid is not dissolved. On the other hand, in the case in which the mole radio of the amount of addition of the organic amine compound to the organic acid is more than 1:0.9 (that is, the amount of the organic amine compound is too large), the flocculation of a coloring material becomes insufficient in a mixture with the first liquid so that the quality of an image is not enhanced.

It is also possible to cause the second liquid to contain the coloring material. A dye, a pigment having sulfonic acid or sulfonate on a surface, and a self-dispersing pigment are preferable for the coloring material to be contained in the second liquid. The reason is follows. It can be supposed that these coloring materials tend to be flocculated in an acidic region with difficulty and the organic acid having the acid dissociation constant pKa of 4.5 or less and the polyvalent metallic salt can be prevented from being flocculated. By using such a coloring material, the storage stability of the second liquid can be enhanced. It is possible to use the dye, the pigment having the sulfonic acid or the sulfonate on the surface and the self-dispersing pigment which are the same as those described as the coloring materials of the first liquid.

In the case in which the pigment is used for the second liquid, it is preferable that the volume-average particle size of the particle of the pigment should be equal to or more than 30 nm and be equal to or less than 250 nm. The volume-average particle size is more preferably equal to or more than 50 nm and equal to or less than 200 nm and is further preferably equal to or more than 75 nm and equal to or less than 175 nm. In some cases in which the volume-average particle size of the particle in the liquid is less than 30 nm, an optical density is reduced. On the other hand, in some cases in which the same volume-average particle size is more than 250 nm, a storage stability cannot be maintained.

For the second liquid, it is possible to use the same water-soluble organic solvent as that in the first liquid. The content of the water-soluble organic solvent to be used is equal to or more than 1% by mass and is equal to or less than 60% by mass, and is preferably equal to or more than 5% by mass and equal to or less than 40% by mass. In some cases in which the amount of the water-soluble organic solvent in the liquid is less than 1% by mass, a sufficient optical density cannot be obtained. To the contrary, in some cases in which the amount of the water-soluble organic solvent is more than 60% by mass, the viscosity of the liquid is increased so that the jet characteristic of the liquid becomes unstable.

In addition, it is also possible to add the polymer dispersing agent used in the first liquid to the second liquid.

It is preferable that the surface tension of the second liquid should be equal to or more than 20 mN/m and be equal to or less than 45 mN/m. The surface tension is more preferably equal to or more than 20 mN/m and equal to or less than 39 mN/m, and is further preferably equal to or more than 20 mN/m and equal to or less than 35 mN/m. In some cases in which the surface tension is less than 20 mN/m, the liquid overflows into a nozzle surface and printing cannot be carried out normally. On the other hand, in some cases in which the surface tension is more than 45 mN/m, a permeability is obtained slowly so that a drying time is prolonged.

The viscosity of the second liquid is preferably equal to or more than 1.2 mPa·s and equal to or less than 25.0 mPa·s, is more preferably equal to or more than 1.5 mPa·s and equal to or less than 10.0 mPa·s, and is further preferably equal to or more than 1.8 mPa·s and equal to or less than 5.0 mPa·s. In some cases in which the viscosities of the first and second liquids are more than 25.0 mPa·s, an ejecting property is deteriorated. On the other hand, in some cases in which the viscosity is less than 1.2 mPa·s, a long-term storage stability is deteriorated.

Water is added within such a range as to obtain the surface tension and the viscosity as described above. The amount of addition of the water is not particularly restricted but is preferably equal to or more than 10% by mass and equal to or less than 99% by mass and is more preferably equal to or more than 30% by mass and equal to or less than 80% by mass with respect to the liquid composition for ink jet or the whole second liquid.

It is also possible to add, into the second liquid, a flocculating agent for flocculating the component of the first liquid.

For example, examples of the flocculating agent include alkali metal ions such as a lithium ion, a sodium ion and a potassium ion.

Specific examples include alkali metallic salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate and potassium benzoate.

The compound may be used singly or at least two types may be mixed for use. Moreover, the content of the flocculating agent in the liquid according to the invention is 0.01 to 15% by mass, preferably 0.1 to 10% by mass.

It is preferable that the number of coarse particles having a size of 5 μm or more in a mixed solution of the first liquid and the second liquid should be equal to or more than 1,000/μL. The same number is more preferably equal to or more than 2,500/μL and is further preferably equal to or more than 5,000/μL. In some cases in which the number of the coarse particles having the size of 5 μm or more in the mixed solution of the first liquid and the second liquid is less than 1,000/μL, an optical density is reduced.

The number of the coarse particles having the size of 5 μm or more in the mixed solution of the first liquid and the second liquid was measured by mixing the two liquids in a mass ratio of 1:1 and taking 2 μL while stirring them by means of Accusizer TM770 Optical Particle Sizer (manufactured by Particle Sizing Systems Co., Ltd.). The density of a pigment was input to be the density of a dispersed particle as a parameter in the measurement. Pigment powder acquired by heating and drying a pigment dispersing solution is measured by means of a specific gravity meter or a specific gravity bottle so that the density of the pigment can be obtained.

Description will be given to an additive which can be properly used in the first liquid and the second liquid (the liquid compositions for ink jet according to the invention).

A surfactant may be used in the first and the second liquids. Compounds having both a hydrophilic portion and a hydrophobic portion in the molecule may be effectively used as the surfactant in the present invention. Any of the anionic surfactant, cationic surfactant, amphoteric surfactant and nonionic surfactant may be used. The polymer dispersant may be used too.

Examples of the anionic surfactant available include alkylbenzene sulfonate, alkylphenyl sulfonate, alkylnaphthalene sulfonate, higher fatty acid salts, sulfate ester salt of higher fatty acid esters, sulfonate salts of higher fatty acid esters, sulfate ester salts or sulfonate salts of higher alcohol ethers, higher alkyl sulfosuccinate, higher alkyl phosphate ester salts and phosphate ester salts of higher alcohol-ethylene oxide adducts. Examples of the effectively used anionic surfactant also include dodecylbenzene sulfonate, alkylbenzene sulfonate, isopropylnaphthalene sulfonate, monobutylphenylphenol monosulfonate, monobutylbiphenyl sulfonate and dibutylphenylphenol disulfonate.

Examples of the nonionic surfactant include polypropyleneglycol-ethylene oxide adduct, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetyleneglycol, acetyleneglycol-oxyethylene adduct, aliphatic alkanolamide, glycerin ester and sorbitan ester.

Examples of the cationic surfactant include tetraammonium alkyl salts, alkylamine salts, benzalkonium slats, alkyl pyridium salts and imidazolium salts, for example dihydroxyethyl stearylamine, 2-heptadecenyl-hydroxyethyl imidazoline, lauryldimethylbenzyl ammonium chloride, cetylpyridium chloride, and stearamide methylpyridium chloride.

Bio-surfactants such as spicrispolic acid, rhamnolipid and lysolecithin may be also used.

For use, the amount of the surfactant to be added to the first liquid and the second liquid is preferably less than 10% by mass, is more preferably 0.01 to 5% by mass, and is further preferably 0.01 to 3% by mass. In some cases in which the amount of addition is equal to or more than 10% by mass, an optical density and the storage stability of a pigment ink are deteriorated.

Other additives such as polyethylenimine, polyamines, polyvinyl pyrrolidone, polyethyleneglycol, cellulose derivatives including ethyl cellulose and carboxymethyl cellulose, polysaccharides and their derivatives, as well as water soluble polymers, polymer emulsions including acrylic polymer emulsions, polyurethane polymer emulsions and hydrophilic latex, hydrophilic polymer gel, cyclodextrin, macrocyclic amines, dendrimers, crown ethers, urea and derivatives thereof, acetamide, silicone-containing surfactants and fluorine-containing surfactants may be used for controlling characteristics such as improvement of ejectability. Alkali metal compounds such as potassium hydroxide, sodium hydroxide and lithium hydroxide; nitrogen-containing compounds such as ammonium hydroxide, triethanolamine, diethanolamine, ethanolamine and 2-amino-2-methyl-1-propanol; alkali earth metal compounds such as calcium hydroxide; acids such as sulfuric acid, hydrochloric acid and nitric acid; and salts between strong acids and alkalescents such as ammonium sulfate may be used for controlling the pH and conductivity.

Additives such as a pH buffer, an antioxidant, a fungicide, a viscosity control agent, a conductive agent and a UV absorber may be also added, if necessary.

(Ink Jet Recording Method and Ink Jet Recording Apparatus)

An ink jet recording method according to the invention serves to carry out printing so as to cause a first liquid and a second liquid to come in contact with each other by using an ink set for ink jet according to the invention. Moreover, an ink jet recording apparatus according to the invention comprises recording heads for ejecting, to a recording medium, liquids in the ink set for ink jet according to the invention. These can apply a recording apparatus provided with a heater for controlling the drying of an ink or a recording apparatus provided with an intermediate transfer mechanism and serving to print a recording material on an intermediate member and then carrying out a transfer onto a recording medium such as a paper in addition to an ordinary ink jet recording apparatus.

In the ink jet recording method (apparatus) according to the invention, it is preferable that both the first liquid and the second liquid should have a mass per drop of 25 ng or less. The mass is more preferably equal to or more than 0.5 ng and equal to or less than 20 ng and is further preferably equal to or more than 2 ng and equal to or less than 8 ng. In some cases in which the mass per drop is more than 25 ng, a blur is caused more seriously. The reason is as follows. It can be supposed that the contact angles of the first liquid and the second liquid with the recording medium are changed depending on the amount of a drop and the drop tends to spread in the direction of the surface of the paper when the amount of the drop is increased.

In an ink jet apparatus capable of jetting drops having a plurality of volumes from one nozzle, the amount of the drop indicates the amount of a minimum drop capable of carrying out printing.

Moreover, the first liquid and the second liquid are applied onto the recording medium in order to come in contact with each other. When the first liquid and the second liquid come in contact with each other, an ink is flocculated by the action of a flocculating agent. Thus, it is possible to obtain a recording method which is excellent in an optical density, a blur, an intercolor blur and a drying time. If they come in contact with each other, they may be applied adjacently to each other or may be covered with each other.

For the order of application onto the recording medium, furthermore, the second liquid is applied and the first liquid is then applied. By applying the second liquid earlier, it is possible to effectively flocculate the component in the first liquid. The first liquid may be applied at any time after the second liquid is applied. It is preferable that the first liquid may be applied after 0.1 second or less after the application of the second liquid.

In the ink jet recording method (apparatus) according to the invention, it is preferable that a mass ratio of the amount of application of the first liquid to the amount of application of the second liquid which is required for forming one pixel should be 1:20 to 20:1. The mass ratio is more preferably 1:10 to 10:1 and is further preferably 1:5 to 5:1. In some cases in which the amount of application of the first liquid is much smaller or larger than the amount of application of the second ink, the flocculation becomes insufficient so that the optical density is reduced, the blur is caused more seriously and the intercolor blur is deteriorated. The pixel implies a lattice point constituted when a desirable image is divided at a minimum distance where the ink can be applied in a scanning direction and a sub-scanning direction. By giving a proper ink set to each pixel, a color and an image density can be regulated and an image is thus formed.

It is preferable that the ink jet recording method (apparatus) according to the invention should employ a thermal ink jet recording system or a piezo ink jet recording system in respect of an effect of improving a blur and an intercolor blur. The cause is not apparent. Although an ink is heated during an ejection so that a viscosity is reduced in case of the thermal ink jet recording system, the temperature of the ink is dropped over a recording medium so that the viscosity is suddenly increased. Therefore, it can be supposed that there is an effect of improving a blur and an intercolor blur. On the other hand, in case of the piezo ink jet system, a liquid having a high viscosity can be ejected. It is possible to suppress the spread of the liquid having a high viscosity over the recording medium in the direction of the surface of the paper. Consequently, it is guessed that there is an effect of improving the blur and the intercolor blur.

A preferred embodiment of the ink jet recording apparatus according to the invention will be described below in detail with reference to the drawings. In the drawings, members having substantially the same functions have the same reference numerals and repetitive description will be omitted.

FIG. 1 is a perspective view showing the structure of an appearance according to a preferred embodiment of the ink jet recording apparatus in accordance with the invention.

Figure 2:
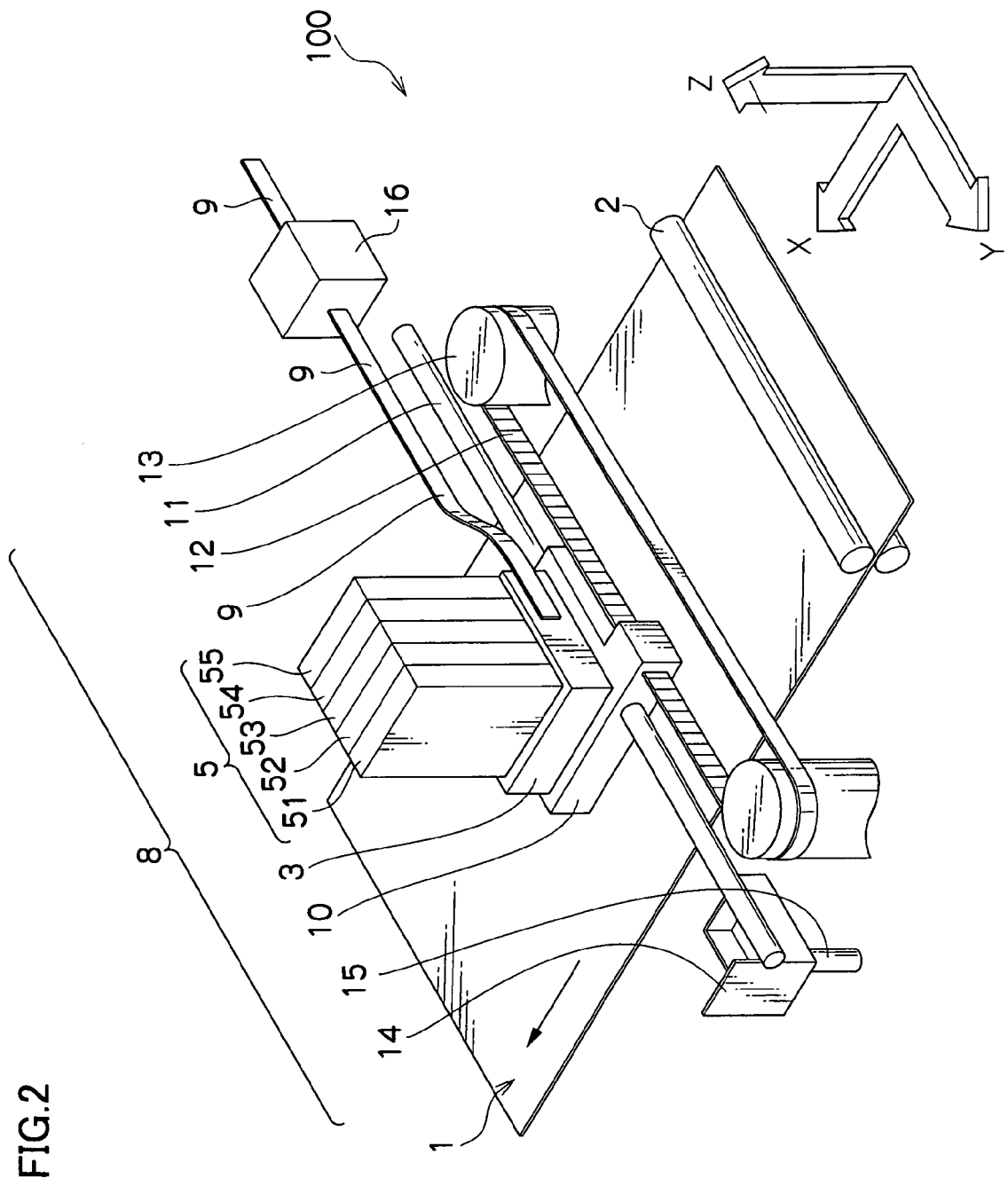
FIG. 2 is a perspective view showing the basic structure of an inner part in the ink jet recording apparatus of FIG. 1.

FIG. 2 is a perspective view showing the basic structure of an inner part in the ink jet recording apparatus (which will be hereinafter referred to as an image forming apparatus) in FIG. 1. An image forming apparatus 100 according to the embodiment has such a structure as to be operated to form an image based on the ink jet recording method according to the invention. More specifically, as shown in FIGS. 1 and 2, the image forming apparatus 100 is mainly constituted by an external cover 6, a tray 7 capable of mounting a recording medium 1 such as a plain paper in a predetermined amount, a delivery roller (delivery means) 2 for delivering the recording medium 1 every sheet into the image forming apparatus 100 and an image forming portion 8 (image forming means) for ejecting an ink and a liquid composition to the surface of the recording medium 1, thereby forming an image.

The delivery roller 2 is a paper feeding mechanism constituted by a pair of rollers provided rotatably in the image forming apparatus 100, and serves to interpose the recording medium 1 set to the tray 7 and to deliver the recording medium 1 in a predetermined amount into the apparatus 100 every sheet in a predetermined timing.

The image forming portion 8 forms an image with an ink over the surface of the recording medium 1. The image forming portion 8 is mainly constituted by a recording head 3, an ink tank 5, a feeding signal cable 9, a carriage 10, a guide rod 11, a timing belt 12, a driving pulley 13, and a maintenance unit 14.

The ink tank 5 has ink tanks 51, 52, 53, 54 and 55 which store inks or liquid compositions having different colors from each other so as to be ejected. These accommodate a black ink (K), a yellow ink (Y), a magenta ink (M) and a cyan ink (C) as a first liquid and a treating solution as a second liquid, for example. Of course, it is not necessary to provide an ink tank for the treating solution separately when the second liquid contains a coloring material.

As shown in FIG. 2, furthermore, the feeding signal cable 9 and the ink tank 5 are connected to the recording head 3. When external image recording information is input from the feeding signal cable 9 to the recording head 3, the recording head 3 sucks an ink in a predetermined amount from each of the ink tanks and ejects the same ink onto the surface of the recording medium based on the image recording information. The feeding signal cable 9 also plays a part in the supply of a necessary power for driving the recording head 3 to the recording head 3 in addition to the image recording information.

Moreover, the recording head 3 is provided and held on the carriage 10, and the guide rod 11 and the timing belt 12 connected to the driving pulley 13 are connected to the carriage 10. By such a structure, the recording head 3 can also be moved in a direction Y (a scanning direction) which is parallel with the surface of the recording medium 1 and is perpendicular to a delivery direction X (a sub-scanning direction) of the recording medium 1 along the guide rod 11.

The image forming apparatus 100 comprises control means (not shown) for regulating the driving timing of the recording head 3 and the driving timing of the carriage 10 based on image recording information. Consequently, it is possible to continuously form an image based on the image recording information in a predetermined region over the surface of the recording medium 1 to be delivered at a predetermined speed in the delivery direction X.

The maintenance unit 14 is connected to a pressure reducing device (not shown) through a tube. Furthermore, the maintenance unit 14 is connected to the nozzle portion of the recording head 3 and has the function of setting the inside of the nozzle of the recording head 3 into a pressure reducing state, thereby sucking an ink from the nozzle of the recording head 3. By providing the maintenance unit 14, it is possible to remove an excessive ink stuck to the nozzle during the operation of the image forming apparatus 100 if necessary or to suppress the evaporation of the ink from the nozzle in an operation stop state.

Figure 3:
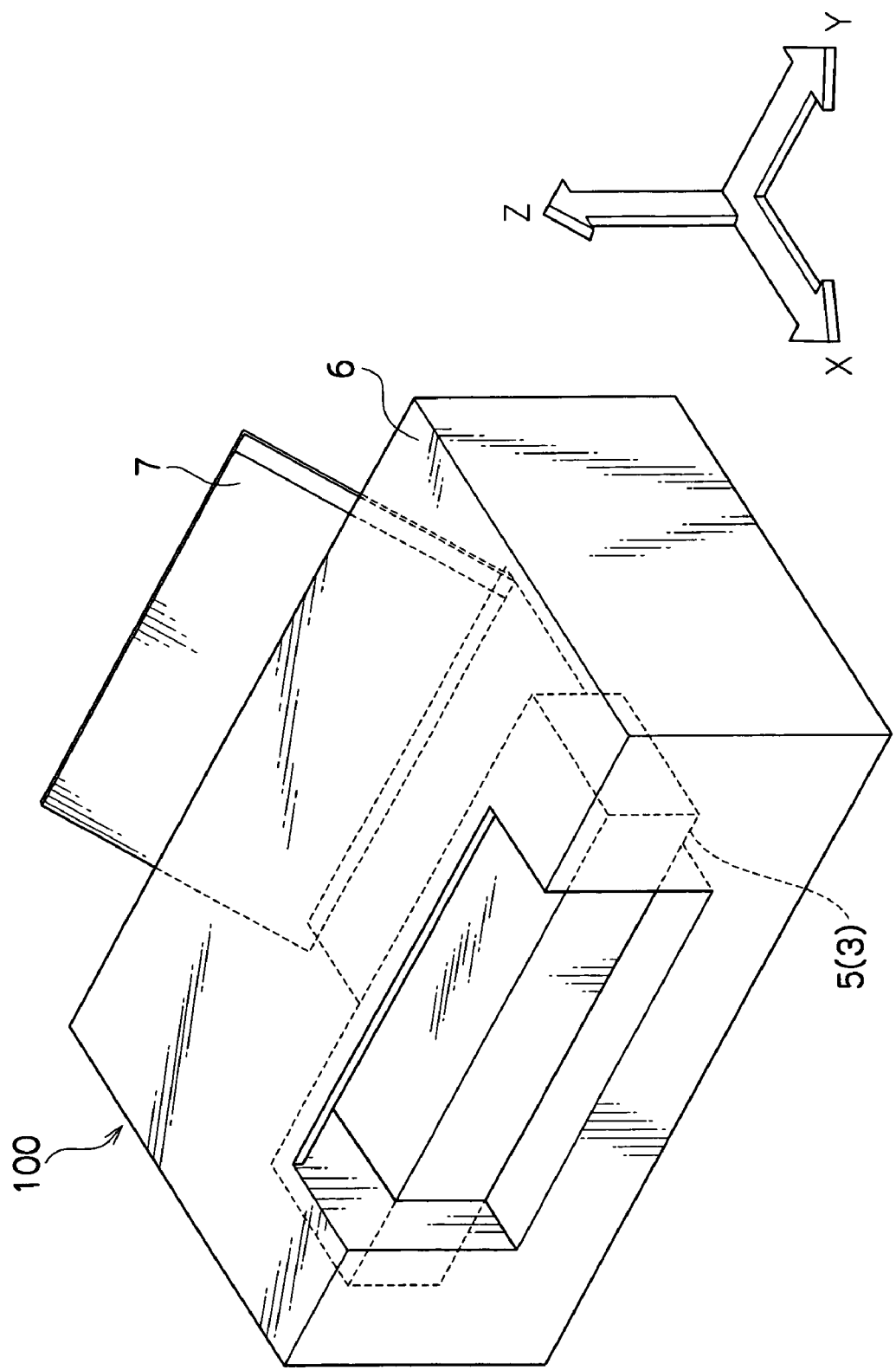
FIG. 3 is a perspective view showing the structure of an appearance according to another preferred embodiment of the ink jet recording apparatus in accordance with the invention.
Figure 4:
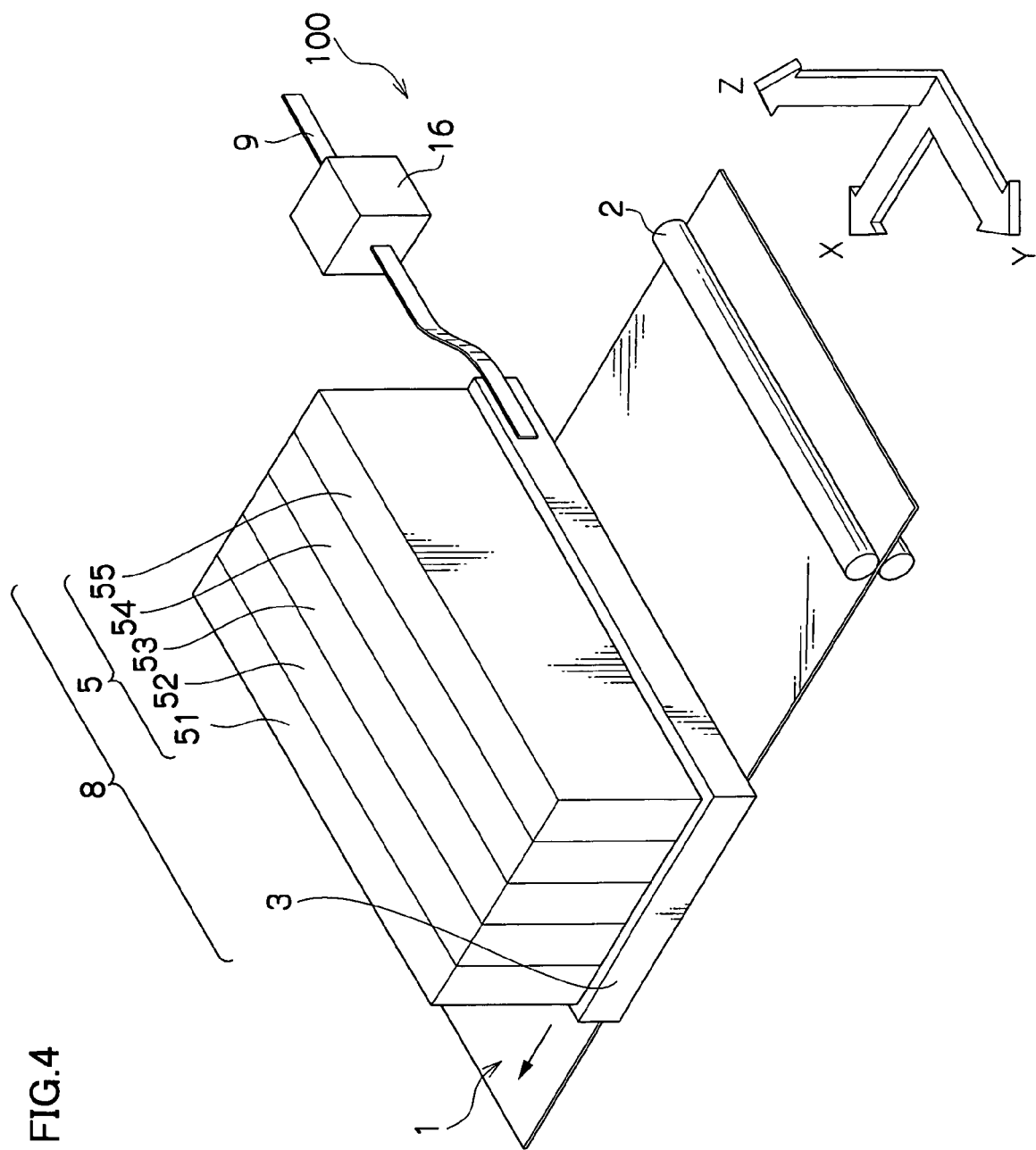
FIG. 4 is a perspective view showing the basic structure of an inner part in the ink jet recording apparatus of FIG. 3.

FIG. 3 is a perspective view showing the structure of an appearance according to another preferred embodiment of the ink jet recording apparatus according to the invention. FIG. 4 is a perspective view showing the basic structure of an inner part of the ink jet recording apparatus (which will be hereinafter referred to as an image forming apparatus) in FIG. 3. An image forming apparatus 100 according to the embodiment has such a structure as to be operated to form an image based on the ink jet recording method according to the invention.

The image forming apparatus 100 shown in FIGS. 3 and 4 includes a recording head 3 having a width which is equal to or greater than the width of a recording medium 1, does not include a carriage mechanism, and is constituted by a paper feeding mechanism (which is a delivery roller 2 in the embodiment but may be a paper feeding mechanism of a belt type, for example) in a sub-scanning direction (the delivery direction of the recording medium 1: the direction of an arrow X). The recording head 3 sequentially arranges ink tanks 51 to 55 in the sub-scanning direction (the delivery direction of the recording medium 1: the direction of the arrow X) and similarly arranges a nozzle group for ejecting each color (including a treating solution) in the sub-scanning direction, which is not shown. Since other structures are the same as those of the image forming apparatus 100 shown in FIGS. 1 and 2, description will be omitted.

The image forming apparatus 100 shown in FIGS. 3 and 4 collectively carries out printing in the transverse direction (scanning direction) of the recording medium 1 by means of the recording medium 3. Therefore, the structure of the apparatus can be more simplified and a printing speed is more increased than a type having a carriage mechanism.

EXAMPLE

More specific description will be given to the invention by taking examples. Each of the examples does not restrict the invention.

<Pigment Treating Method 1>

An ultrasonic homogenizer is operated over a pigment dispersing solution put on the market. Then, a centrifugal separating treatment (8000 rpm×30 minutes) is carried out over the dispersing solution to remove a residue portion (20% of the amount of initial projection) so that a pigment dispersing solution is obtained.

<Pigment Treating Method 2>

10% by mass of a pigment and 1.5% by mass of a dispersing agent are added into a predetermined amount of ion-exchange water and are stirred. An ultrasonic homogenizer is operated over the mixed liquid to disperse the pigment. Furthermore, a centrifugal separating treatment (8000 rpm×30 minutes) is carried out over the dispersing solution to remove a residue portion (20% of the amount of initial projection) so that a pigment dispersing solution is obtained.

<Pigment Treating Method 3>

A sulfanilic acid solution is heated and 100 g of a pigment is added during stirring. The mixture is stirred and cooled to a room temperature at the same time and 14 g of concentrated nitric acid is dropped. 10 g of an $NaNO_2$ solution is added to the solution and is stirred until a reaction is ended. A desalting treatment is carried out over the pigment. Ion-exchange water is added in such a manner that the concentration of a surface finishing pigment thus obtained is 12 wt %, and pH is regulated to be 7.5, and a dispersion is then carried out by using an ultrasonic homogenizer. The dispersing solution is subjected to a centrifugal separating treatment (8000 rpm×30 minutes) by means of a centrifugal separator to remove a residue portion (20% of a whole amount) so that a pigment dispersing solution is obtained.

<Liquid Preparing Method>

A coloring material solution, a water-soluble organic solvent, a surfactant and ion-exchange water are added in proper amounts in order to obtain a predetermined composition, and a mixed solution is then blended and stirred. A liquid thus obtained is caused to pass through a 5 μm filter so that a desirable liquid is obtained.

(Liquid 1-A)

By using a pigment treated in accordance with a pigment treating method 1, a preparation is carried out by a predetermined method.

-Composition-
  Cabojet—300 (manufactured by Cabot Corporation) (self-dispersing pigment/carboxyl acid group): 4% by mass
  Styrene-acrylic acid-sodium acrylate copolymer: 1% by mass
  Diethylene glycol: 20% by mass
  Glycerin: 5% by mass
  Acetylene glycol ethylene oxide adduct: 0.5% by mass
  Ion-exchange water: residue portion The liquid has pH of 8.5, a volume-average particle size of 93 nm, a surface tension of 31 mN/m and a viscosity of 3.3 mPa·s. The respective physical property values are obtained at 20° C.

(Liquid 1-B)

By using a pigment treated in accordance with the pigment treating method 1, a preparation is carried out by a predetermined method.

-Composition-
  Cabojet—200 (manufactured by Cabot Corporation) (self-dispersing pigment/sulfonic acid group): 4% by mass
  Styrene-acrylic acid-sodium acrylate copolymer: 1% by mass
  Diethylene glycol: 20% by mass
  Glycerin: 5% by mass
  Acetylene glycol ethylene oxide adduct: 1% by mass
  Ion-exchange water: residue portion The liquid has pH of 8.6, a volume-average particle size of 102 nm, a surface tension of 31 mN/m and a viscosity of 3.2 mPa·s. The respective physical property values are obtained at 20° C.

(Liquid 1-C)

By using a pigment treated in accordance with a pigment treating method 2, a preparation is carried out by a predetermined method.

-Composition-
- Mogul L (manufactured by Cabot Corporation) (pigment/ no surface functional group): 4% by mass
- Styrene-acrylic acid-sodium acrylate copolymer: 0.6% by mass
- Diethylene glycol: 15% by mass
- Diglycerin ethylene oxide adduct: 5% by mass
- Polyoxyethylene-2-ethyl hexyl ether: 0.75% by mass
- Ion-exchange water: residue portion The liquid has pH of 8.2, a volume-average particle size of 120 nm, a surface tension of 32 mN/m and a viscosity of 3.3 mPa·s. The respective physical property values are obtained at 20° C.

(Liquid 1-D)

By using a pigment treated in accordance with the pigment treating method 1, a preparation is carried out by a predetermined method.

-Composition-
- Cabojet—200 (manufactured by Cabot Corporation) (self-dispersing pigment/sulfonic acid group): 4% by mass
- Diethylene glycol: 20% by mass
- Glycerin: 5% by mass
- Acetylene glycol ethylene oxide adduct: 1% by mass
- Ion-exchange water: residue portion The liquid has pH of 8.9, a volume-average particle size of 96 nm, a surface tension of 31 mN/m and a viscosity of 3.1 mPa·s. The respective physical property values are obtained at 20° C.

(Liquid 1-E)

-Composition-
- Diethyleneglycol: 30% by mass
- Tartaric acid (pKa=3.0): 4.5% by mass
- Magnesium nitrate·6 hydrates: 3% by mass
- Sodium hydroxide: 0.6% by mass
- Acetylene glycol ethylene oxide adduct: 1% by mass
- Ion-exchange water: residue portion The liquid has pH of 3.8, a surface tension of 30 mN/m and a viscosity of 2.8 mPa·s. The respective physical property values are obtained at 20° C.

(Liquid 1-F)

-Composition-
- Diethylene glycol: 30% by mass
- 2-furan carboxylic acid (pKa=2.4): 4% by mass
- Magnesium nitrate·6 hydrates: 0.11% by mass
- Sodium hydroxide: 0.75% by mass
- Acetylene glycol ethylene oxide adduct: 1% by mass
- Ion-exchange water: residue portion The liquid has pH of 4.3, a surface tension of 31 mN/m and a viscosity of 2.5 mPa·s. The respective physical property values are obtained at 20° C.

(Liquid 1-G)

-Composition-
- Diethylene glycol: 30% by mass
- Succinic acid (pKa=4.0): 2% by mass
- Magnesium nitrate·6 hydrates: 4% by mass
- Sodium hydroxide: 1% by mass
- Acetylene glycol ethylene oxide adduct: 1% by mass
- Ion-exchange water: residue portion The liquid has pH of 4.3, a surface tension of 32 mN/m and a viscosity of 2.7 mPa·s. The respective physical property values are obtained at 20° C.

(Liquid 1-H)

-Composition-
- Diethylene glycol: 30% by mass
- Acetic acid (pKa=4.56): 6% by mass
- Magnesium nitrate·6 hydrates: 0.03% by mass
- Sodium hydroxide: 3.5% by mass
- Acetylene glycol ethylene oxide adduct: 1% by mass
- Ion-exchange water: residue portion The liquid has pH of 7.2, a surface tension of 31 mN/m and a viscosity of 2.6 mPa·s. The respective physical property values are obtained at 20° C.

(Liquid 1-I)

By using a pigment treated in accordance with the pigment treating method 1, a preparation is carried out by a predetermined method.

-Composition-
- Cabojet—250 (manufactured by Cabot Corporation) (self-dispersing pigment/sulfonic acid group): 4% by mass
- Styrene-acrylic acid-potassium acrylate copolymer: 1% by mass
- Diethylene glycol: 20% by mass
- Propylene glycol: 5% by mass
- Acetylene glycol ethylene oxide adduct: 1% by mass
- Ion-exchange water: residue portion The liquid has pH of 7.8, a volume-average particle size of 86 nm, a surface tension of 30 mN/m and a viscosity of 3.3 mPa·s. The respective physical property values are obtained at 20° C.

(Liquid 1-J)

By using a pigment treated in accordance with a pigment treating method 3, a preparation is carried out by a predetermined method.

-Composition-
- C.I. Pigment Red 122 (self-dispersing pigment/sulfonic acid group): 4% by mass
- Styrene-methacrylic acid-potassium methacrylate copolymer: 1% by mass
- Diethylene glycol: 15% by mass
- N-methyl-2-pyrrolidone: 5% by mass
- Sulfolane: 5% by mass
- Acetylene glycol ethylene oxide adduct: 1% by mass
- Ion-exchange water: residue portion The liquid has pH of 8.0, a volume-average particle size of 103 nm, a surface tension of 30 mN/m and a viscosity of 3.1 mPa·s. The respective physical property values are obtained at 20° C.

(Liquid 1-K)

By using a pigment treated in accordance with the pigment treating method 3, a preparation is carried out by a predetermined method.

-Composition-
- C.I. Pigment Yellow 128 (self-dispersing pigment/sulfonic acid group): 4% by mass
- Styrene-acrylic acid-potassium acrylate copolymer: 1% by mass
- Diethylene glycol: 20% by mass
- Diethyene glycol monobutyl ether: 5% by mass
- Acetylene glycol ethylene oxide adduct: 1% by mass
- Ion-exchange water: residue portion The liquid has pH of 7.9, a volume-average particle size of 130 nm, a surface tension of 30 mN/m and a viscosity of 3.1 mPa·s. The respective physical property values are obtained at 20° C.

(Liquid 1-L)

By using a pigment treated in accordance with the pigment treating method 1, a preparation is carried out by a predetermined method.

Composition-
- Cabojet—250 (manufactured by Cabot Corporation) (self-dispersing pigment/sulfonic acid group): 4% by mass
- Glycerin: 15% by mass
- Ethylene glycol: 5% by mass
- Propylene glycol: 5% by mass
- 2-furan carboxylic acid (pKa=2.4): 4% by mass
- Calcium nitrate·4 hydrates: 2% by mass
- Sodium hydroxide: 0.8% by mass
- Acetylene glycol ethylene oxide adduct: 1% by mass
- Ion-exchange water: residue portion The liquid has pH of 4.4, a volume-average particle size of 104 nm, a surface tension of 30 mN/m and a viscosity of 3.0 mPa·s. The respective physical property values are obtained at 20° C.

(Liquid 1-M)

-Composition-
- Diethylene glycol: 30% by mass
- Tartaric acid (pKa=3.0): 4.5% by mass
- Magnesium nitrate·6 hydrates: 8.5% by mass
- Sodium hydroxide: 0.6% by mass
- Acetylene glycol ethylene oxide adduct: 1% by mass
- Ion-exchange water: residue portion The liquid has pH of 3.3, a surface tension of 30 mN/m and a viscosity of 3.1 mPa·s. The respective physical property values are obtained at 20° C.

(Liquid 1-N)

-Composition-
- Diethylene glycol: 30% by mass
- Tartaric acid (pKa=3.0): 4.5% by mass
- Magnesium nitrate·6 hydrates: 0.05% by mass
- Sodium hydroxide: 1.3% by mass
- Acetylene glycol ethylene oxide adduct: 1% by mass
- Ion-exchange water: residue portion The liquid has pH of 7.5, a surface tension of 30 mN/m and a viscosity of 3.1 mPa·s. The respective physical property values are obtained at 20° C.

[Liquid 1-O]

-Composition-
- Diethylene glycol: 30% by mass
- Hydrochloric acid (Inorganic acid): 0.36% by mass
- Magnesium nitrate·6 hydrates: 4% by mass
- Acetylene glycol ethylene oxide adduct: 1% by mass
- Ion-exchange water: residue portion The liquid has pH of less than zero (which cannot be measured), a surface tension of 30 mN/m and a viscosity of 2.5 mPa·s. The respective physical property values are obtained at 20° C.

Examples 1-1 to 1-5 and Comparative Examples 1-1 to 1-5

Figure 6:
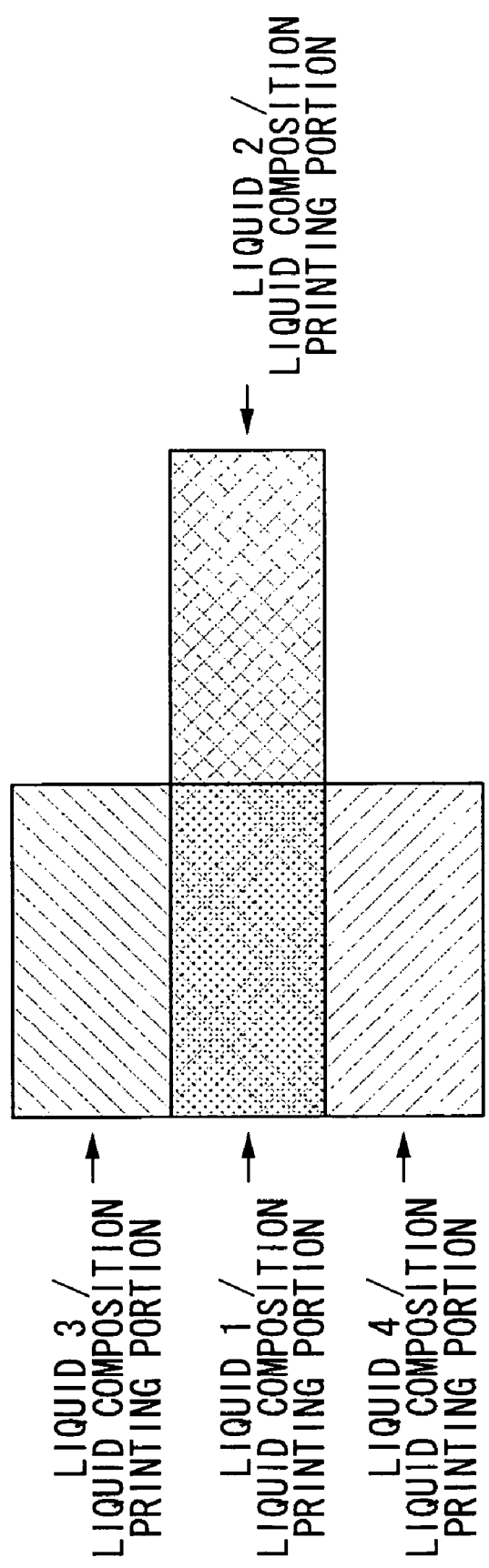
FIG. 6 is a view showing a printing pattern for the evaluation in the example.

By using an ink set in accordance with Tables 1 and 2, printing is carried out. The printing is performed by a method of ejecting a second liquid (a liquid composition for ink jet) to an FX-P paper (manufactured by Fuji Xerox Co., Ltd.) and ejecting a first liquid (liquids 1 to 4 in accordance with the Tables) from thereabove by using a 800 dpi and 256-nozzle trial print head (an amount of drop of 14 ng). The printing is carried out in a general environment (a temperature of 23±0.5° C. and a humidity of 55±5% R. H), and a mass ratio of the amounts of application of the first and second liquids for forming one pixel is set to be 1:0.2. An estimation is performed for a sample left in the general environment for 24 hours after the printing based on printing patterns A to C shown in FIGS. 5 to 7 (excluding a drying time and a long-term storage stability).

<<Optical Density>>

An optical density is measured in the printing portion for each of the printing patterns by using X-Rite 404 (manufactured by X-Rite Co., Ltd.). In the case in which a standard is not satisfied in the printing portion for any of the printing patterns, an estimation of a "lower grade" is set (for example, if any of the printing portions is "b" and other printing portions are "a", the estimation of a sample is set to be "b"). In any of the following estimating methods, the same estimation standard is employed.

-Estimation Standard (Black Ink)- a . . . optical density of 1.4 or more b . . . optical density which is equal to or more than 1.3 and is less than 1.4 c . . . optical density of less than 1.3

-Estimation Standard (Color Ink)- a . . . optical density of 1.1 or more b . . . optical density which is equal to or more than 1.0 and is less than 1.1 c . . . optical density of less than 1.0

<<Intercolor Blur>>

In an estimation for an intercolor blur, patterns having different colors which are adjacent to each other are printed and are collated with a boundary sample having a predetermined degree of a blur in a boundary portion, and a sensory estimation is thus carried out.

-Estimation Standarda . . . small blur b . . . blur generated on allowable level c . . . great blur generated beyond allowance <<Blur>>

A fine line pattern is printed and the degree of a blur in the printing portion is collated with that of a boundary sample, and a sensory estimation is thus carried out.

-Estimation Standarda . . . small blur b . . . blur generated on allowable level c . . . great blur generated beyond allowance <<Drying Time>>

After a predetermined time passes since the printing of a 100% coverage pattern, another FX-C2 paper is pressed on the printing pattern at a load of $1.9 \times 10^4$ N/m². At this time, a time required until a liquid is not transferred to the pressed FX-C2 paper side is set to be a drying time.

-Estimation Standarda . . . drying time of less than 3 seconds b . . . drying time which is equal to or more than 3 seconds and is less than 10 seconds c . . . drying time of 10 seconds or more <<Long-Term Storage Stability>>

Referring to a long-term storage stability, a first liquid and a liquid composition are left in an estimation environment for three years and the viscosities and surface tensions of inks are compared with each other at an initial stage and after leaving.

-Estimation Standarda . . . change rate of characteristic value after leaving with respect to initial characteristic value which is less than 5% b . . . change rate of characteristic value after leaving with respect to initial characteristic value which is equal to or more than 5% and is less than 15% c . . . change rate of characteristic value after leaving with respect to initial characteristic value which is equal to or more than 15%

<<Long-Term Jet Property>>

A long-term jet property is judged based on the aging of a jet speed in a recording head of each of the first liquid and the second liquid. More specifically, the jet speed is measured in an initial state. Then, $5 \times 10^8$ pulse printing is carried out. Thereafter, the jet speed is measured. The ratio of the jet speed after the $5 \times 10^8$ pulse printing for the ink jet speed in the initial state is calculated and an estimation is carried out in accordance with the following estimation standard.

-Estimation Standarda . . . jet speed at $5 \times 10^8$ pulse which is equal to or more than 85% of initial jet speed b . . . jet speed at $5 \times 10^8$ pulse which is equal to or more than 60% of initial jet speed and is less than 85% thereof c . . . jet speed at $5 \times 10^8$ pulse which is less than 60% of initial jet speed <Conclusion of Estimation Result>

The estimation results are concluded in Tables 3 and 4. As shown in the Tables 3 and 4, an optical density, a blur, an intercolor blur, a drying time, a long-term storage stability and a long-term jet property are excellent in the examples 1-1 to 1-5 in which an organic acid having an acid dissociation constant pKa of 4.5 or less and a polyvalent metallic salt were contained and the first liquid and the liquid composition are applied to the recording medium so as to come in contact with each other.

TABLE 1

|  |  | Ink | Printing pattern | pKa | Mole ratio of polyvalent metallic salt to organic acid | pH | Viscosity | Surface tension (mN/m) | Volume-average particle size (nm) | Number of particles of 5 μm or more in mixture of 1:1 (number/μL) |
|---|---|---|---|---|---|---|---|---|---|---|
| Example 1-1 | Liquid 1 | 1-A | A | — | — | 8.5 | 3.3 | 31 | 93 | 9810 |
|  | Liquid composition (liquid 2) | 1-E |  | 2.99 | 0.39 | 3.8 | 2.8 | 30 | — |  |
| Example 1-2 | Liquid 1 | 1-B | A | — | — | 8.6 | 3.2 | 31 | 102 | 8960 |
|  | Liquid composition (liquid 2) | 1-F |  | 2.41 | 0.012 | 4.3 | 2.5 | 31 | — |  |
| Example 1-3 | Liquid 1 | 1-C | A | — | — | 8.2 | 3.3 | 32 | 120 | 6150 |
|  | Liquid composition (liquid 2) | 1-G |  | 4.00 | 0.92 | 4.3 | 2.7 | 32 | — |  |
| Comparative example 1-1 | Liquid 1 | 1-D | A | — | — | 8.9 | 3.1 | 31 | 96 | 23 |
|  | Liquid composition (liquid 2) | 1-H |  | 4.56 | 0.0017 | 7.2 | 2.6 | 31 | — |  |
| Comparative example 1-2 | Liquid 1 | 1-A | A | — | — | 8.5 | 3.3 | 31 | 93 | 12400 |
|  | Liquid composition (liquid 2) | 1-M |  | 3.0 | 1.1 | 3.3 | 3.1 | 30 | — |  |
| Comparative example 1-3 | Liquid 1 | 1-A | A | — | — | 8.5 | 3.3 | 31 | 93 | 310 |
|  | Liquid composition (liquid 2) | 1-N |  | 3.0 | 0.007 | 7.3 | 3.1 | 30 | — |  |
| Comparative example 1-4 | Liquid 1 | 1-A | A | — | — | 8.5 | 3.3 | 31 | 93 | 7060 |
|  | Liquid composition (liquid 2) | 1-O |  | — (Inorganic acid) | — | <0 | 2.5 | 30 | — |  |

TABLE 2

|  |  | Ink | Printing pattern | pKa | Mole ratio of polyvalent metallic salt to organic acid | pH | Viscosity | Surface tension (mN/m) | Volume-average particle size (nm) | Number of particles of 5 μm or more in mixture of 1:1 (number/μL) |
|---|---|---|---|---|---|---|---|---|---|---|
| Example 1-4 | Liquid 1 | 1-A | B | — | — | 8.5 | 3.3 | 31 | 93 | 7650 |
|  | Liquid 2 | 1-I |  | — | — | 7.8 | 3.3 | 30 | 86 | (A/E) |
|  | Liquid 3 | 1-J |  | — | — | 8.0 | 3.1 | 30 | 103 |  |
|  | Liquid 4 | 1-K |  | — | — | 7.9 | 3.1 | 30 | 130 |  |
|  | Liquid composition | 1-E |  | 2.99 | 0.39 | 3.8 | 2.8 | 30 | — |  |

TABLE 2-continued

|  | Ink | Printing pattern | pKa | Mole ratio of polyvalent metallic salt to organic acid | pH | Viscosity | Surface tension (mN/m) | Volume-average particle size (nm) | Number of particles of 5 μm or more in mixture of 1:1 (number/μL) |
|---|---|---|---|---|---|---|---|---|---|
| Example 1-5 | Liquid 1 | 1-B | C | — | — | 8.6 | 3.2 | 31 | 102 | 7030 |
|  | Liquid 2 | 1-J |  | — | — | 8.0 | 3.1 | 30 | 103 | (B/L) |
|  | Liquid 3 | 1-K |  | — | — | 7.9 | 3.1 | 30 | 130 |  |
|  | Liquid composition | 1-L |  | 2.41 | 0.24 | 4.4 | 3.0 | 30 | 104 |  |
| Comparative example 1-5 | Liquid 1 | 1-A | B | — | — | 8.5 | 3.3 | 31 | 93 | 50 |
|  | Liquid 2 | 1-I |  | — | — | 7.8 | 3.3 | 30 | 86 | (A/H) |
|  | Liquid 3 | 1-J |  | — | — | 8.0 | 3.1 | 30 | 103 |  |
|  | Liquid 4 | 1-K |  | — | — | 7.9 | 3.1 | 30 | 130 |  |
|  | Liquid composition | 1-H |  | 4.56 | 0.0017 | 7.2 | 2.6 | 31 | — |  |

TABLE 3

|  | Optical density | Blur | Drying time | Long-term storage stability | Long-term jet characteristic |
|---|---|---|---|---|---|
| Example 1-1 | a | a | a | a | a |
| Example 1-2 | a | a | a | a | a |
| Example 1-3 | a | a | a | a | a |
| Comparative example 1-1 | c | c | a | a | a |
| Comparative example 1-2 | a | a | a | c | c |
| Comparative example 1-3 | c | c | a | a | a |
| Comparative example 1-4 | a | a | a | c | c |

TABLE 4

|  | Optical density | Blur | Inter-color blur | Drying time | Long-term storage stability | Long-term jet characteristic |
|---|---|---|---|---|---|---|
| Example 1-4 | a | a | a | a | a | a |
| Example 1-5 | a | a | a | a | a | a |
| Comparative example 1-5 | c | c | a | a | a | a |

(Liquid 2-A)

By using a pigment treated in accordance with the pigment treating method 1, a preparation is carried out by a predetermined method.

-Composition-
Cabojet—300 (manufactured by Cabot Corporation) (self-dispersing pigment/carboxyl acid group): 4% by mass
Styrene-acrylic acid-sodium acrylate copolymer: 1% by mass
Diethylene glycol: 20% by mass
Glycerin: 5% by mass
Acetylene glycol ethylene oxide adduct: 0.5% by mass
Ion-exchange water: residue portion The liquid has pH of 8.5, a volume-average particle size of 93 nm, a surface tension of 31 mN/M and a viscosity of 3.3 mPa·s at 20° C.

(Liquid 2-B)

By using a pigment treated in accordance with the pigment treating method 1, a preparation is carried out by a predetermined method.

-Composition-
Cabojet—200 (manufactured by Cabot Corporation) (self-dispersing pigment/sulfonic acid group): 4% by mass
Styrene-acrylic acid-sodium acrylate copolymer: 1% by mass
Diethylene glycol: 20% by mass
Glycerin: 5% by mass
Acetylene glycol ethylene oxide adduct: 1% by mass
Ion-exchange water: residue portion The liquid has pH of 8.6, a volume-average particle size of 102 nm, a surface tension of 31 mN/m and a viscosity of 3.2 mPa·s at 20° C.

(Liquid 2-C)

By using a pigment treated in accordance with the pigment treating method 2, a preparation is carried out by a predetermined method.

-Composition-
Mogul L (manufactured by Cabot Corporation) (pigment/no surface functional group): 4% by mass
Styrene-acrylic acid-sodium acrylate copolymer: 0.6% by mass
Diethylene glycol: 15% by mass
Diglycerin ethylene oxide adduct: 5% by mass
Polyoxyethylene-2-ethyl hexyl ether: 0.75% by mass
Ion-exchange water: residue portion The liquid has pH of 8.2, a volume-average particle size of 120 nm, a surface tension of 32 mN/m and a viscosity of 3.3 mPa·s at 20° C.

(Liquid 2-D)

By using a pigment treated in accordance with the pigment treating method 1, a preparation is carried out by a predetermined method.

-Composition-
Cabojet—200 (manufactured by Cabot Corporation) (self-dispersing pigment/sulfonic acid group): 4% by mass
Diethylene glycol: 20% by mass
Glycerin: 5% by mass
Acetylene glycol ethylene oxide adduct: 1% by mass
Ion-exchange water: residue portion The liquid has pH of 8.9, a volume-average particle size of 96 nm, a surface tension of 31 mN/m and a viscosity of 3.1 mPa·s at 20° C.

(Liquid 2-E)

-Composition-
Diethylene glycol: 30% by mass
2-furan carboxylic acid (pKa=2.41): 7.5% by mass
Triethanol amine: 3% by mass
Acetylene glycol ethylene oxide adduct: 1% by mass
Ion-exchange water: residue portion The liquid has pH of 3.6, a surface tension of 31 mN/m and a viscosity of 2.9 mPa·s at 20° C.

(Liquid 2-F)

-Composition-
Diethylene glycol: 30% by mass
Nicotinic acid (pKa=2.05): 7.5% by mass
Triisopropanol amine: 4.5% by mass
Acetylene glycol ethylene oxide adduct: 1% by mass
Ion-exchange water: residue portion
The liquid has pH of 4.0, a surface tension of 31 mN/m and a viscosity of 2.8 mPa·s at 20° C.

(Liquid 2-G)

-Composition-
Diethylene glycol: 30% by mass
Acetic acid (pKa=4.56): 6% by mass
Sodium hydroxide: 2% by mass
Acetylene glycol ethylene oxide adduct: 1% by mass
Ion-exchange water: residue portion
The liquid has pH of 5.5, a surface tension of 31 mN/m and a viscosity of 2.6 mPa·s at 20° C.

(Liquid 2-H)

By using a pigment treated in accordance with the pigment treating method 1, a preparation is carried out by a predetermined method.

-Composition-
Cabojet—200 (manufactured by Cabot Corporation) (self-dispersing pigment/sulfonic acid group): 4% by mass
Styrene-acrylic acid-potassium acrylate copolymer: 1% by mass
Diethylene glycol: 20% by mass
Propylene glycol: 5% by mass
Acetylene glycol ethylene oxide adduct: 1% by mass
Ion-exchange water: residue portion
The liquid has pH of 7.8, a volume-average particle size of 86 nm, a surface tension of 30 mN/m and a viscosity of 3.3 mPa·s at 20° C.

(Liquid 2-I)

By using a pigment treated in accordance with the pigment treating method 3, a preparation is carried out by a predetermined method.

-Composition-
C.I. Pigment Red 122 (self-dispersing pigment/sulfonic acid group): 4% by mass
Styrene-methacrylic acid-potassium methacrylate copolymer: 1% by mass
Diethylene glycol: 15% by mass
N-methyl-2-pyrrolidone: 5% by mass
Sulfolane: 5% by mass
Acetylene glycol ethylene oxide adduct: 1% by mass
Ion-exchange water: residue portion
The liquid has pH of 8.0, a volume-average particle size of 103 nm, a surface tension of 30 mN/m and a viscosity of 3.1 mPa·s at 20° C.

(Liquid 2-J)

By using a pigment treated in accordance with the pigment treating method 3, a preparation is carried out by a predetermined method.

-Composition-
C.I. Pigment Yellow 128 (self-dispersing pigment/sulfonic acid group): 4% by mass
Styrene-acrylic acid-potassium acrylate copolymer: 1% by mass
Diethylene glycol: 20% by mass
Diethylene glycol monobutyl ether: 5% by mass
Acetylene glycol ethylene oxide adduct: 1% by mass
Ion-exchange water: residue portion
The liquid has pH of 7.9, a volume-average particle size of 130 nm, a surface tension of 30 mN/m and a viscosity of 3.1 mPa·s.

(Liquid 2-K)

By using a pigment treated in accordance with the pigment treating method 1, a preparation is carried out by a predetermined method.

-Composition-
Cabojet—250 (manufactured by Cabot Corporation) (self-dispersing pigment/sulfonic acid group): 4% by mass
Glycerin: 15% by mass
Ethylene glycol: 5% by mass
Propylene glycol: 5% by mass
Glutamic acid (pKa=2.18): 6% by mass
Triisopropanol amine: 3.5% by mass
Acetylene glycol ethylene oxide adduct: 1% by mass
Ion-exchange water: residue portion
The liquid has pH of 4.6, a volume-average particle size of 95 nm, a surface tension of 31 mN/m and a viscosity of 3.2 mPa·s at 20° C.

<Liquid 2-L>

-Composition-
Diethylene glycol: 30% by mass
2-furan carboxylic acid (pKa=2.41): 7.5% by mass
Triethanol amine: 0.9% by mass
Acetylene glycol ethylene oxide adduct: 1% by mass
Ion-exchange water: residue portion
The liquid has pH of 3.2, a surface tension of 31 mN/m and a viscosity of 2.6 mPa·s at 20° C.

(Liquid 2-M)

-Composition-
Diethylene glycol: 30% by mass
2-furan carboxylic acid (pKa=2.41): 7.5% by mass
Triethanol amine: 10.98% by mass
Acetylene glycol ethylene oxide adduct: 1% by mass
Ion-exchange water: residue portion
The liquid has pH of 7.3, a surface tension of 31 mN/m and a viscosity of 3.3 mPa·s at 20° C.

(Liquid 2-N)

-Composition-
Diethylene glycol: 30% by mass
2-furan carboxylic acid (pKa=2.41): 7.5% by mass
Polyallylamine (PAA-01 (weight-average molecular weight 1100) manufactured by Nitto Boseki Co., Ltd.): 6.5% by mass
Acetylene glycol ethylene oxide adduct: 1% by mass
Ion-exchange water: residue portion
The liquid has pH of 7.8, a surface tension of 32 mN/m and a viscosity of 4.2 mPa·s at 20° C.

Examples 2-1 to 2-5 and Comparative Examples 2-1 to 2-5

By using the ink set in accordance with the Tables 1 to 2, the printing and estimation are carried out in the same manner as in the examples 1-1 to 1-5 and the comparative examples 1-1 to 1-5.

<Conclusion of Estimation Result>

Estimation results are concluded in Tables 7 and 8. As shown in the Tables 7 and 8, an optical density, a blur, an intercolor blur, a drying time and a long-term storage stability are excellent in the examples 2-1 to 2-5 in which an organic acid having an acid dissociation constant pKa of 4.5 or less and an organic amine compound are contained and the first liquid and the liquid composition are applied to the recording medium so as to come in contact with each other.

Example 3-1

By using liquid composition 3-A and an ink set in accordance with Table 9, printing is carried out as Example 1 and 2. The results are concluded in Table 10.

(Liquid 3-A)

-Composition-
Diethylene glycol: 30% by mass
2-furan carboxylic acid (pKa=2.41): 5% by mass
Magnesium nitrate·6 hydrates: 4% by mass
Sodium hydroxide: 1.1% by mass
Triethanol amine: 1% by mass
Acetylene glycol ethylene oxide adduct: 1% by mass
Ion-exchange water: residue portion The liquid has pH of 3.8, a surface tension of 31 mN/m and a viscosity of 3.2 mPa·s. The respective physical property values are obtained at 20° C.

TABLE 7

|  | Optical density | Blur | Drying time | Long-term storage stability |
|---|---|---|---|---|
| Example 2-1 | a | a | a | a |
| Example 2-2 | a | a | a | a |
| Example 2-3 | a | a | a | a |
| Comparative example 2-1 | c | c | a | a |
| Comparative example 2-2 | a | a | a | b |
| Comparative example 2-3 | c | c | a | a |
| Comparative example 2-4 | c | c | a | a |

TABLE 8

|  | Optical density | Blur | Intercolor blur | Drying time | Long-term storage stability |
|---|---|---|---|---|---|
| Example 2-4 | a | a | a | a | a |
| Example 2-5 | a | a | a | a | a |
| Comparative example 2-5 | c | c | a | a | a |

TABLE 5

|  | Ink | Printing pattern | pKa | Molecular weight of organic amine | Organic acid: mole ratio of organic amine | pH | Viscosity | Surface tension (mN/m) | Volume-average particle size (nm) | Number of particles of 5 μm or more in mixture of 1:1 (number/μL) |
|---|---|---|---|---|---|---|---|---|---|---|
| Example 2-1 | Liquid 1 | 2-A | A | — | — | — | 8.5 | 3.3 | 31 | 93 | 7650 |
|  | Liquid composition | 2-E |  | 2.41 | 149.2 | 1:0.30 | 3.6 | 2.9 | 31 | — |  |
| Example 2-2 | Liquid 1 | 2-B | A | — | — | — | 8.6 | 3.2 | 31 | 102 | 9130 |
|  | Liquid composition | 2-F |  | 2.05 | 191.3 | 1:0.38 | 4.0 | 2.8 | 31 | — |  |
| Example 2-3 | Liquid 1 | 2-C | A | — | — | — | 8.2 | 3.3 | 32 | 120 | 8900 |
|  | Liquid composition | 2-F |  | 2.05 | 191.3 | 1:0.38 | 4.0 | 2.8 | 31 | — |  |
| Comparative example 2-1 | Liquid 1 | 2-D | A | — | — | — | 8.9 | 3.1 | 31 | 96 | 50 |
|  | Liquid composition | 2-G |  | 4.56 | None | — | 5.5 | 2.6 | 31 | — |  |
| Comparative example 2-2 | Liquid 1 | 2-A | A | — | — | — | 8.5 | 3.3 | 31 | 93 | 8100 |
|  | Liquid composition | 2-L |  | 2.41 | 149.2 | 1:0.09 | 3.2 | 2.6 | 31 | — |  |
| Comparative example 2-3 | Liquid 1 | 2-A | A | — | — | — | 8.5 | 3.3 | 31 | 93 | 82 |
|  | Liquid composition | 2-M |  | 2.41 | 149.2 | 1:1.1 | 7.3 | 3.3 | 31 | — |  |
| Comparative example 2-4 | Liquid 1 | 2-A | A | — | — | — | 8.5 | 3.3 | 31 | 93 | 120 |
|  | Liquid composition | 2-N |  | 2.41 | 1100 | 1:0.088 | 7.8 | 4.2 | 32 | — |  |

TABLE 6

|  | Ink | Printing pattern | pKa | Molecular weight of organic amine | Organic acid: mole ratio of organic amine | pH | Viscosity | Surface tension (mN/m) | Volume-average particle size (nm) | Number of particles of 5 μm or more in mixture of 1:1 (number/μL) |
|---|---|---|---|---|---|---|---|---|---|---|
| Example 2-4 | Liquid 1 | 2-A | B | — | — | — | 8.5 | 3.3 | 31 | 93 | 7650 |
|  | Liquid 2 | 2-H |  | — | — | — | 7.8 | 3.3 | 30 | 86 | (A/E) |
|  | Liquid 3 | 2-I |  | — | — | — | 8.0 | 3.1 | 30 | 103 |  |
|  | Liquid 4 | 2-J |  | — | — | — | 7.9 | 3.1 | 30 | 130 |  |
|  | Liquid composition | 2-E |  | 2.41 | 149.2 | 1:0.30 | 3.6 | 2.9 | 31 | — |  |
| Example 2-5 | Liquid 1 | 2-B | C | — | — | — | 8.6 | 3.2 | 31 | 102 | 6340 |
|  | Liquid 2 | 2-I |  | — | — | — | 8.0 | 3.1 | 30 | 103 | (B/K) |
|  | Liquid 3 | 2-J |  | — | — | — | 7.9 | 3.1 | 30 | 130 |  |
|  | Liquid composition | 2-K |  | 2.18 | 191.3 | 1:0.45 | 4.6 | 3.2 | 31 | 95 |  |
| Comparative example 2-5 | Liquid 1 | 2-A | B | — | — | — | 8.5 | 3.3 | 31 | 93 | 50 |
|  | Liquid 2 | 2-H |  | — | — | — | 7.8 | 3.3 | 30 | 86 | (A/G) |
|  | Liquid 3 | 2-I |  | — | — | — | 8.0 | 3.1 | 30 | 103 |  |
|  | Liquid 4 | 2-J |  | — | — | — | 7.9 | 3.1 | 30 | 130 |  |
|  | Liquid composition | 2-G |  | 4.56 | None | — | 5.5 | 2.6 | 31 | — |  |

TABLE 9

| | Ink | Printing Pattern | pKa | Organic Acid: polyvalent matallic salt Mole ratio | Organic Acid: organic amine Mole ratio | pH | Viscosity | Surface tension (mN/m) | Volume-average particle size (nm) | Number of particles of 5 μm or more in mixture of 1:1 (number/μL) |
|---|---|---|---|---|---|---|---|---|---|---|
| Example 3-1 | Liquid 1 | 1-A | A | — | — | 8.5 | 3.3 | 31 | 93 | 8429 |
| | Liquid Composition | 3-A | | 2.41 | 1:0.35 | 1:0.15 | 3.8 | 3.2 | 31 | — |

TABLE 10

| | Optical density | Blur | Drying time | Long-term storage stability |
|---|---|---|---|---|
| Example 3-1 | a | a | a | a |

What is claimed is:

1. A liquid composition for ink jet printing which contains at least an organic acid having an acid dissociation constant pKa of 4.5 or less, a water-soluble solvent, and water, further comprising at least one of the compounds selected from the following group,
   (a): a polyvalent metallic salt having an amount of addition to the organic acid which is equal to or more than 0.01 and is less than 1 in mole ratio (the polyvalent metallic salt/organic acid); and
   (b): an organic amine compound having an amount of addition to the organic acid which is equal to or more than 0.1 and is equal to or less than 0.9 in mole ratio (the organic amine compound/organic acid).

2. The liquid composition for ink jet printing according to claim 1, wherein the organic acid is a compound expressed by the following Formula (1),

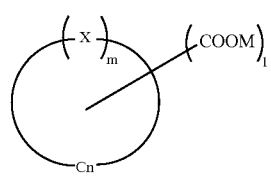

Formula (1)

wherein, X represents O, CO, NH, NR, S, or $SO_2$, R represents an alkyl group, M represents a hydrogen atom, an alkali metal, or an amine, l represents an integer of 1 to 5, m represents 1 or 2, and n represents an integer of 3 to 7.

3. The liquid composition for ink jet printing according to claim 2, wherein the compound expressed by the Formula (1) is at least one selected from the group consisting of pyrrolidone carboxylic acid, pyrone carboxylic acid, pyrrole carboxylic acid, furan carboxylic acid, pyridine carboxylic acid, coumalinic acid, thiophene carboxylic acid, nicotinic acid, derivatives of their compounds, and their salts.

4. The liquid composition for ink jet printing according to claim 1, wherein the pH thereof is equal to or more than 2.5 and is equal to or less than 7.0.

5. The liquid composition for ink jet printing according to claim 1, wherein a weight-average molecular weight of the organic amine compound is equal to or less than 1000.

6. The liquid composition for ink jet printing according to claim 1, wherein an amount of addition of the organic amine compound in the liquid composition is equal to or more than 0.01% by mass and is equal to or less than 30% by mass with respect to the whole amount of the liquid composition.

7. The liquid composition for ink jet printing according to claim 1, wherein an amount of addition of the organic acid in the liquid composition is equal to or more than 0.01% by mass and is equal to or less than 30% by mass with respect to the whole amount of the liquid composition.

8. An ink set for ink jet printing which has at least a first liquid and a second liquid,
   the first liquid containing at least a coloring material, a water-soluble solvent, and water, and
   the second liquid being the liquid composition for ink jet printing according to claim 1.

9. The ink set for ink jet printing according to claim 8, wherein the coloring material in the first liquid is a pigment which is at least one selected from the group consisting of a pigment dispersed by a polymer dispersing agent, a self-dispersable pigment, and a pigment covered with a resin.

10. The ink set for ink jet printing according to claim 9, wherein a volume-average particle size of particles of the coloring material in the first liquid is equal to or more than 30 nm and is equal to or less than 250 nm.

11. The ink set for ink jet printing according to claim 8, wherein the first liquid has a surface tension which is equal to or more than 20 mN/m and is equal to or less than 60 mN/m.

12. The ink set for ink jet printing according to claim 8, wherein the first liquid contains a resin having a carboxylic acid group.

13. The ink set for ink jet printing according to claim 8, wherein the second liquid contains at least one coloring material selected from the group consisting of a dye, a pigment having a sulfonic acid or sulfonate on a surface, and a self-dispersing pigment.

14. The ink set for ink jet printing according to claim 8, wherein the second liquid has a surface tension which is equal to or more than 20 mN/m and is equal to or less than 45 mN/M.

15. The ink set for ink jet printing according to claim 8, wherein the first liquid and the second liquid have viscosities which are equal to or more than 1.2 mPa·s and are equal to or less than 25.0 mPa·s.

16. The ink set for ink jet printing according to claim 8, wherein the number of particles having a size of 5 μm or more in a mixed solution of the first liquid and the second liquid is equal to or more than 1,000/μL.

17. An ink jet recording method using the ink set for ink jet printing according to claim 8, wherein the first liquid and the second liquid are applied on a recording medium so as to come in contact with each other and form an image.

18. The ink jet recording method according to claim 17, wherein the first liquid and the second liquid are applied on the recording medium in an amount of 25 ng or less per drop.

19. The ink jet recording method according to claim 17, wherein an amount of each of the first liquid and the second liquid to be applied for forming one pixel ranges from 1:20 to 20:1 in mass ratio.

20. An ink jet recording apparatus comprising a recording head that ejects, to a recording medium, each of the liquids in the ink set for ink jet printing according to claim 8.

21. The ink jet recording apparatus according to claim 20, wherein the first liquid and the second liquid are applied on the recording medium in an amount of 25 ng or less per drop.

22. The ink jet recording apparatus according to claim 20, wherein an amount of each of the first liquid and the second liquid to be applied for forming one pixel ranges from 1:20 to 20:1 in a mass ratio.

* * * * *